United States Patent
Basile et al.

(10) Patent No.: US 8,254,761 B2
(45) Date of Patent: Aug. 28, 2012

(54) COPYING DIGITAL CONTENT BY EMULATING PLAYING OF A RECORDING MEDIUM BY A PLAYER

(75) Inventors: Carmen Laura Basile, Maidenhead (GB); Jonny Boyd Reckless, Maidenhead (GB)

(73) Assignee: Rovi Solutions Corporation, Santa Clara ( * ) Notice: Subject to any disclaimer, the term of this patent is extended or adjusted under 35 U.S.C. 154(b) by 1514 days.

(21) Appl. No.: 11/715,144

(22) Filed: Mar. 7, 2007

(65) Prior Publication Data

US 2008/0219123 A1    Sep. 11, 2008

(51) Int. Cl.
  *H04N 5/93*    (2006.01)
(52) U.S. Cl. ........................ 386/279; 386/255
(58) Field of Classification Search .................. 386/231, 386/252, 235, 279, 255
  See application file for complete search history.

(56) References Cited

U.S. PATENT DOCUMENTS

| | | | |
|---|---|---|---|
| 6,724,981 B1 * | 4/2004 | Park et al. ...................... | 386/231 |
| 6,839,312 B2 | 1/2005 | Heylen | |
| 6,856,756 B1 * | 2/2005 | Mochizuki et al. ........... | 386/330 |
| 7,062,686 B2 | 6/2006 | Moritomo | |
| 7,127,149 B1 | 10/2006 | Lin | |
| 2002/0015448 A1 * | 2/2002 | Honjo ....................... | 375/240.25 |
| 2002/0067829 A1 * | 6/2002 | Ficco .......................... | 380/210 |
| 2002/0076046 A1 | 6/2002 | Heylen | |
| 2003/0101140 A1 | 5/2003 | So et al. | |
| 2005/0019017 A1 | 1/2005 | Green | |
| 2006/0021057 A1 * | 1/2006 | Risan et al. .................... | 726/26 |
| 2006/0083485 A1 * | 4/2006 | Kikuchi ......................... | 386/95 |
| 2006/0088288 A1 * | 4/2006 | Lin ................................ | 386/83 |
| 2006/0143134 A1 * | 6/2006 | So et al. .......................... | 705/59 |
| 2007/0036356 A1 * | 2/2007 | Holzapfel et al. ............ | 380/201 |
| 2007/0036517 A1 | 2/2007 | Ikeda et al. | |
| 2007/0036527 A1 | 2/2007 | Kim | |
| 2007/0140667 A1 | 6/2007 | Uchimura | |
| 2007/0201814 A1 * | 8/2007 | Yamauchi ....................... | 386/52 |
| 2007/0223872 A1 * | 9/2007 | Huang et al. .................... | 386/52 |
| 2008/0022125 A1 | 1/2008 | Basile | |
| 2009/0034931 A1 * | 2/2009 | Stone et al. ..................... | 386/52 |

FOREIGN PATENT DOCUMENTS

| | | |
|---|---|---|
| KR | 10-2004-0075242 A | 8/2004 |
| WO | WO 00/74053 | 12/2000 |
| WO | WO 01/61695 A1 | 8/2001 |
| WO | WO 01/61696 A1 | 8/2001 |

(Continued)

OTHER PUBLICATIONS

Tanenbaum, "Structured Computer Organization", pp. 10-12, 1984.*

(Continued)

*Primary Examiner* — David Harvey

(74) *Attorney, Agent, or Firm* — Morrison & Foerster LLP

(57) ABSTRACT

Copying apparatus has a reader operable to access locations of a recording medium to read both content data and navigational command data that determines the order in which a player of the recording medium will access the content data. A navigator executes a navigation command in accordance with navigation data read by the reader. A controller controls the location of the recording medium accessed by the reader in accordance with the result of the execution of a navigation command executed by the navigator so as to cause the reader to follow a navigation path through the content data defined by the navigation data and to cause a presentation data storer to store data for enabling recording of the content data for the navigational path.

16 Claims, 12 Drawing Sheets

FOREIGN PATENT DOCUMENTS

| WO | WO 02/11136 A1 | 2/2002 |
| --- | --- | --- |
| WO | WO 2005/081245 A2 | 9/2005 |
| WO | WO 2005/093746 | * 10/2005 |
| WO | WO 2008/005184 A2 | 1/2008 |

OTHER PUBLICATIONS

International Search Report for International application No. PCT/US2008/002633 mailed Jun. 17, 2008, 1 page.

* cited by examiner

COPYING DIGITAL CONTENT BY EMULATING PLAYING OF A RECORDING MEDIUM BY A PLAYER

FIELD OF THE INVENTION

This invention relates to an apparatus for and a method of copying digital content carried by a recording medium such as an optical disc or other recording medium from which content data that can be accessed in a non-sequential manner using navigational data stored by the recording medium. Such a recording medium is referred to hereinafter simply as a "recording medium".

BACKGROUND OF THE INVENTION

The advent of digital recording techniques has enabled digital copies of digital content carried by recording media such as optical discs (for example DVDs) to be made with little or no loss of copy quality. This makes it easy for an unauthorised person to produce unauthorised copies of digital content carrying recording media. Accordingly, copy-protection techniques have been developed. Most current copy-protection techniques exploit differences in the ways a legitimate player and an unauthorised copying apparatus or "ripper" would access a recording medium in order to defeat copying while preserving good playability. For example, in some existing techniques subversive data is added to the digital data in such a manner that the subversive data is ignored by a legitimate player but corrupts the unauthorised copy made by a ripper, in other cases data is altered to affect the digital sum value (DSV) of some of the digital data in a manner which does not affect a legitimate player but interferes with an unauthorised copying apparatus or "ripper.

The above types of copy-protection may prevent digital copying of the content of an optical disc such as a DVD by a ripper that copies the data on a sector-by-sector or a file-by-file basis (for example "ISO/File mode rippers" for ripping DVDs). However, other more sophisticated rippers may be able to parse navigation information contained on the optical disc so as to select the content data be copied. Thus, for example, so-called "IFO parsing rippers" are capable of parsing navigation information contained on a DVD and automatically selecting the "main title" or the "main program chain (PGC)" for ripping or allowing the user the possibility of selecting a particular title or a particular program chain from amongst those available.

SUMMARY OF THE INVENTION

The navigational data recorded with the content data on a recording medium defines the navigational path that a player follows through the content data recorded on the recording medium. The inventors have invented a copy-protection technique that incorporates into the navigational information recorded on a recording medium at least one conditional navigation command which causes the navigational path through the content data recorded on the recording medium to be defined dynamically as the recording medium is being played by the player and results in the correct navigational path being followed only if the player meets a criterion required by the conditional navigational command. For example, in an embodiment, in order for the correct navigational path to be followed, a value stored by the player must match a value set by the conditional navigation command and that value may be set only once a certain action associated with the playing of the recording medium has occurred, for example the value may be set as the player commences playing the recording medium or in response to a user selecting a menu option. Where the criterion required by the conditional navigational command is not met, then that conditional navigational command may direct the apparatus trying to read the recording medium to incorrect data, for example comprising any one or more of: false content data; blank content data; the correct content data in the wrong order; only part of the content data; subversive data that detrimentally affects the ability of a copying apparatus to produce a playable copy recording medium. Examples of subversive data that may be used are described in, for example WO02/11136, WO00/74053, WO01/61695 and WO01/61696, the whole contents of each of which are hereby incorporated by reference. Another possibility may be to deliberately damage areas of the DVD containing the incorrect program chains which may make any copy DVD unplayable.

The incorporation of such conditional navigational commands makes it difficult for a ripper or other unauthorised accessing apparatus to identify the content data to be copied by static analysis and, where the conditional navigational command points to incorrect data until the required criterion is met during playing of the recording medium, may even fool the ripper into selecting that incorrect data for copying.

The inventors have also invented a copy-protection technique that incorporates into the navigational information recorded on a recording medium a very large number of spurious titles and/or program chains that look similar to the main title/program chain (for example in the number of chapters or in presentation time) but that point to incorrect data. The incorporation of these spurious titles/program chains makes it difficult for a ripper or other unauthorised accessing apparatus to identify the main title/program chain and hence the content data to be copied by static analysis and may even fool the ripper into selecting that incorrect data for copying.

Although such copy protection prevents unauthorised copying, it also prevents production of a digital copy by an authorised copying apparatus.

In one aspect the present invention provides copying apparatus for producing a digital copy of digital content carried by a recording medium, wherein the copying apparatus is capable of emulating playing of the recording medium by a player to enable the copying apparatus to navigate correctly through the recording medium even where the navigational information recorded on a recording medium includes at least one of navigation commands conditional on a state of a player during playing of the recording medium and a very large number of spurious titles and/or program chains that look similar to the main title/program chain.

In one aspect, the present invention provides a copying apparatus that accesses a recording medium such as an optical disc, for example a DVD, in the same manner as a player but instead of playing the content of the recording medium, stores the content plus possibly some navigation information data for playback and/or recordal onto a recording medium.

This invention relates to an apparatus for and a method of copying digital content carried by a recording medium such as an optical disc or other recording medium from which content data that can be accessed in a non-sequential manner using navigational data stored by the recording medium. Such a recording medium is referred to hereinafter simply as a "recording medium".

BACKGROUND OF THE INVENTION

The advent of digital recording techniques has enabled digital copies of digital content carried by recording media such as optical discs (for example DVDs) to be made with little or no loss of copy quality. This makes it easy for an unauthorised person to produce unauthorised copies of digital content carrying recording media. Accordingly, copy-protection techniques have been developed. Most current copy-protection techniques exploit differences in the ways a legitimate player and an unauthorised copying apparatus or "ripper" would access a recording medium in order to defeat copying while preserving good playability. For example, in some existing techniques subversive data is added to the digital data in such a manner that the subversive data is ignored by a legitimate player but corrupts the unauthorised copy made by a ripper, in other cases data is altered to affect the digital sum value (DSV) of some of the digital data in a manner which does not affect a legitimate player but interferes with an unauthorised copying apparatus or "ripper.

The above types of copy-protection may prevent digital copying of the content of an optical disc such as a DVD by a ripper that copies the data on a sector-by-sector or a file-by-file basis (for example "ISO/File mode rippers" for ripping DVDs). However, other more sophisticated rippers may be able to parse navigation information contained on the optical disc so as to select the content data be copied. Thus, for example, so-called "IFO parsing rippers" are capable of parsing navigation information contained on a DVD and automatically selecting the "main title" or the "main program chain (PGC)" for ripping or allowing the user the possibility of selecting a particular title or a particular program chain from amongst those available.

SUMMARY OF THE INVENTION

The navigational data recorded with the content data on a recording medium defines the navigational path that a player follows through the content data recorded on the recording medium. The inventors have invented a copy-protection technique that incorporates into the navigational information recorded on a recording medium at least one conditional navigation command which causes the navigational path through the content data recorded on the recording medium to be defined dynamically as the recording medium is being played by the player and results in the correct navigational path being followed only if the player meets a criterion required by the conditional navigational command. For example, in an embodiment, in order for the correct navigational path to be followed, a value stored by the player must match a value set by the conditional navigation command and that value may be set only once a certain action associated with the playing of the recording medium has occurred, for example the value may be set as the player commences playing the recording medium or in response to a user selecting a menu option. Where the criterion required by the conditional navigational command is not met, then that conditional navigational command may direct the apparatus trying to read the recording medium to incorrect data, for example comprising any one or more of: false content data; blank content data; the correct content data in the wrong order; only part of the content data; subversive data that detrimentally affects the ability of a copying apparatus to produce a playable copy recording medium. Examples of subversive data that may be used are described in, for example WO02/11136, WO00/74053, WO01/61695 and WO01/61696, the whole contents of each of which are hereby incorporated by reference. Another possibility may be to deliberately damage areas of the DVD containing the incorrect program chains which may make any copy DVD unplayable.

The incorporation of such conditional navigational commands makes it difficult for a ripper or other unauthorised accessing apparatus to identify the content data to be copied by static analysis and, where the conditional navigational command points to incorrect data until the required criterion is met during playing of the recording medium, may even fool the ripper into selecting that incorrect data for copying.

The inventors have also invented a copy-protection technique that incorporates into the navigational information recorded on a recording medium a very large number of spurious titles and/or program chains that look similar to the main title/program chain (for example in the number of chapters or in presentation time) but that point to incorrect data. The incorporation of these spurious titles/program chains makes it difficult for a ripper or other unauthorised accessing apparatus to identify the main title/program chain and hence the content data to be copied by static analysis and may even fool the ripper into selecting that incorrect data for copying.

Although such copy protection prevents unauthorised copying, it also prevents production of a digital copy by an authorised copying apparatus.

In one aspect the present invention provides copying apparatus for producing a digital copy of digital content carried by a recording medium, wherein the copying apparatus is capable of emulating playing of the recording medium by a player to enable the copying apparatus to navigate correctly through the recording medium even where the navigational information recorded on a recording medium includes at least one of navigation commands conditional on a state of a player during playing of the recording medium and a very large number of spurious titles and/or program chains that look similar to the main title/program chain.

In one aspect, the present invention provides a copying apparatus that accesses a recording medium such as an optical disc, for example a DVD, in the same manner as a player but instead of playing the content of the recording medium, stores the content plus possibly some navigation information data for playback and/or recordal onto a recording medium.

In one aspect, the present invention provides a copying apparatus that parses and utilises navigation information in the same way as a player would do and which may determine each possible navigation path through the recording medium and display data representing these navigation paths to a user, for example as a list of titles or program chains, so that the users can select what content data they wish to copy.

BRIEF DESCRIPTION OF THE DRAWINGS

Embodiments of the present invention will now be described, by way of example, with reference to the accompanying drawings, in which.

DETAILED DESCRIPTION OF EMBODIMENTS

Figure 1:
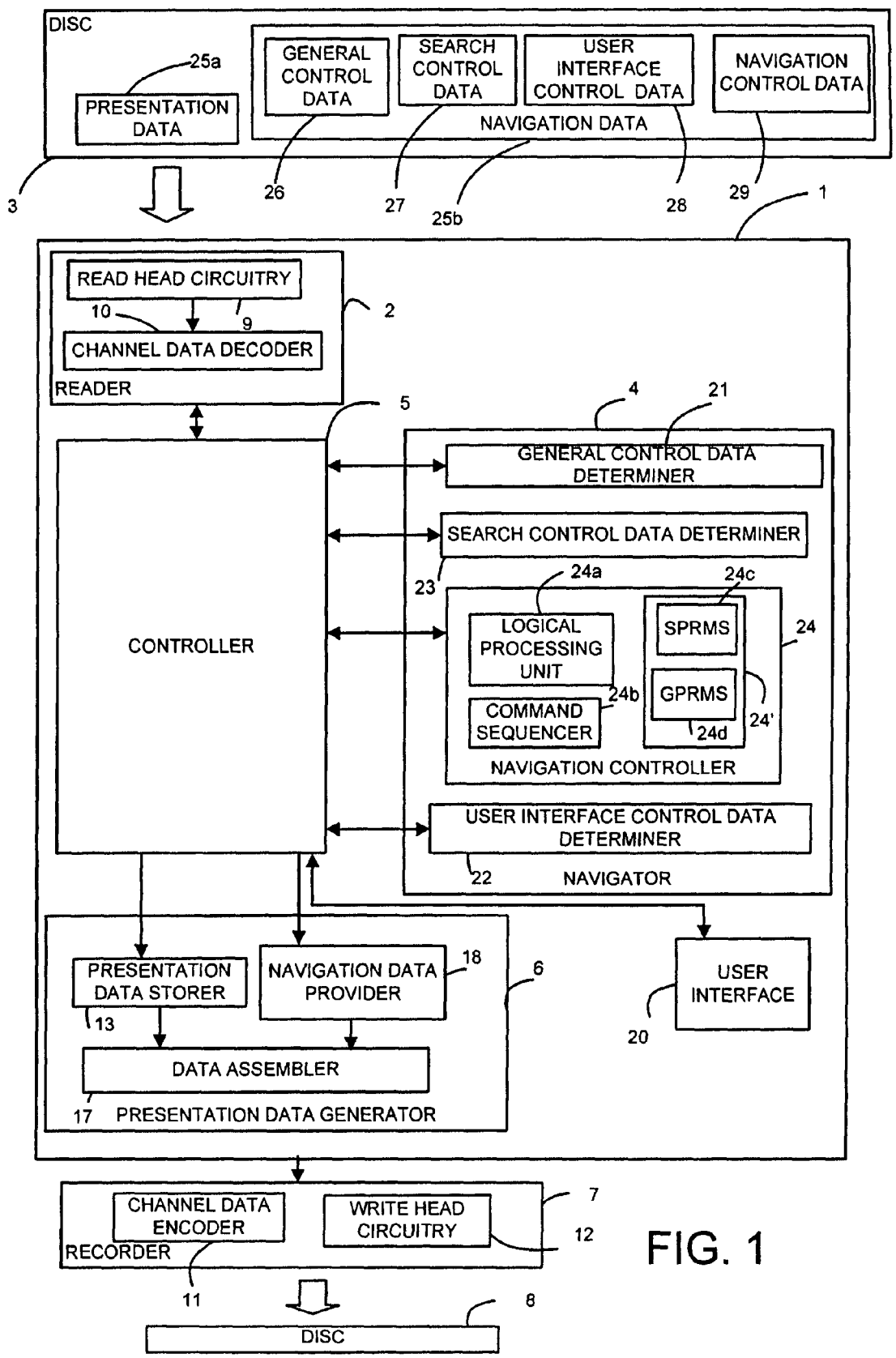
FIG. 1 shows a functional block diagram of copying apparatus for producing a digital copy of a recorded optical disc such as a DVD.

Referring now to FIG. 1, a copying apparatus 1 has a reader 2 operable to produce a digital copy of digital content carried by a recording medium 3 such as an optical disc, in this case a Digital Versatile Video Disc (DVD-Video).

As shown in FIG. 1, the recording medium 3 carries both presentation data 25a (that is the audio and video content data to be delivered to a viewer by a DVD player) and navigation data 25b (comprising general control data 26, search control data 27, user interface control data 28 and navigation control data 29) to enable navigation through the content of the disc 3 in a non-sequential manner in accordance with the appropriate DVD standard.

The copying apparatus has a reader 2 with a read head circuitry 9 operable to read sectors of data from a recorded DVD 4 and a channel data decoder 10 operable to decode channel data read by the read head circuitry 9. Although not shown in FIG. 1, as is conventional, the channel data decoder 10 comprises a clock extractor for extracting a clock signal, a de-interleaver or de-shuffler for de-shuffling sectors, a sub-code retriever for retrieving sub-code and a channel decoder for decoding the channel data.

The copying apparatus also has a navigator 4 operable to navigate the presentation data 25a carried by a recording medium by using the navigation data 25b carried by the recording medium 3 and to enable the copying apparatus to emulate operations of a legitimate DVD player and to extract from the recording medium 3 digital content data and any required navigation data.

The copying apparatus 1 also has a presentation data generator 6 operable to assemble digital content data extracted from the DVD being copied with any required navigation data to produce presentation data and to store that assembled presentation data ready for display to a user and/or recordal on a recordable recording medium, in this example a DVD.

In the example shown, the copying apparatus 1 has a recorder 7 operable to record the stored assembled presentation data on a recordable DVD 8. The recorder 7 has a channel data encoder 11 and write head circuitry 12 for writing or "burning" sectors of data onto a recordable DVD 8. Although not shown in FIG. 1, as is conventional, the channel data encoder 11 comprises a channel data coder having an interleaver, a sub-code adder and a channel encoder for carrying out the conventional DVD channel encoding operations to produce channel code data to be burn onto a recordable DVD 8 by the write head circuitry 12. As shown in FIG. 1, the recorder 7 forms part of the copying apparatus. The recorder 7 may however be a separate recorder to which the data is supplied via a communications link or network.

Overall operation of the copying apparatus 1 is controlled and synchronised by a controller 5 which communicates with the reader 2, the navigator 4, the presentation data generator 6, the recorder 7 and a user interface 20 that enables a user to communicate with the copying apparatus so as to control operations of the copying apparatus and so as to be supplied with information by the controller 5.

As set out above, the navigator 4 is operable to emulate functions of a legitimate DVD player to enable successful copying. To this end, in this example, the navigator 4 comprise a general control data determiner 21 operable to receive from the controller 5 general control data 26 extracted from a recording medium 3, a search control data determiner 23 operable to receive from the controller 5 search control data 27 extracted from a recording medium 3, a user interface control data determiner 22 operable to receive from the controller 5 user interface control data extracted from a recording medium 3 and a navigation controller 24 operable to receive navigation control data 29 extracted from a recording medium 3. The control, search and user interface data allow the navigator to reproduce the DVD-Video content in a linear manner during normal playback and allow the navigator to search through the DVD-video in a non-linear manner, for example to skip chapters and search forwards or backwards.

The navigation controller 24 comprises a logical processing unit 24a operable to control overall operations of the navigation controller 24, a command sequencer 24b operable to interpret and act upon commands in extracted navigation control data 29, and a memory 24'. The memory 24' comprises system parameter registers SPRMs 24c corresponding to the system parameter registers that in a legitimate player are normally used to hold information such as language code, audio and sub-picture settings and parental level, and general parameter registers GPRMs 24d corresponding to the general parameter registers that in a legitimate player are normally used by on-disc programs for keeping score, storing viewer responses, or tracking which sections of the disc have been viewed.

The navigation controller 24 effectively provides a virtual state machine that is operable to transition through different DVD video zone states determined by, for example, conditional navigational commands and user menu option selection, as the copying apparatus accesses the data recorded on the recording medium.

As shown in FIG. 1, the presentation data generator 6 comprises a presentation data storer 13 operable to store extracted digital content data, a navigation data storer 18 operable to store navigation data to be used for navigating the extracted digital content data and a data assembler 17 operable to assemble the extracted digital content data and navigation data and to store the assembled data ready for recordal by the recorder 7.

Although as shown in FIG. 1, control of the reader 2 and the presentation data generator 6 and communication with the navigator 4 is via the controller, the navigator 4 may, under the overall control of the controller 5, communicate directly with the reader 2 and/or the presentation data generator 6 so that, rather than supplying data via the controller 5, the reader 2 may supply data (presentation data and/or navigation data) directly to the navigator 4 and/or the navigator 4 may supply data (presentation data and/or navigation data) directly to the presentation data generator 6. Similarly, the user interface 20 may, where appropriate, communicate directly with the navigator 4, for example directly with the user interface control data determiner 22, rather than via the controller 5.

It will of course be appreciated that the functional components shown in FIG. 1 simply illustrate the functionality provided by the copying apparatus and should not be taken to imply that these functional components exist as discrete physical entities. Rather, the functionality may be provided by one or more physical components and, in the latter case, the functionality provided by a single functional component shown in FIG. 1 may be distributed between different physical components. In addition, different aspects of the functionality may not be identifiable as separate functionality. As an example, the functionality of the navigator described above may not be identifiable as separate functions but may rather represent different aspects of the functioning of the navigator. Also, the copying apparatus need not necessarily have a separate controller, rather the functions of the controller may be carried out by the navigator.

FIG. 1 shows the reader and the presentation data generator as part of the copying apparatus. However either one of or both of the reader and the presentation data generator may be a separate physical entity coupled to the copying apparatus by at least one of a direct wired connection, a direct wireless connection, an indirect wired connection and an indirect wireless connection, where an indirect connection may be via a network. Similarly, the recorder 7 may be part of the copying apparatus (as a separate entity or as part of the presentation data generator, for example) or may, as shown in FIG. 1, be a separate physical entity coupled to the copying apparatus by at least one of a direct wired connection, a direct wireless connection, an indirect wired connection and an indirect wireless connection, where an indirect connection may be via a network.

The functional components shown in FIG. 1 may, as appropriate, be provided by hardware, firmware, software or any combination of these.

Figure 2:
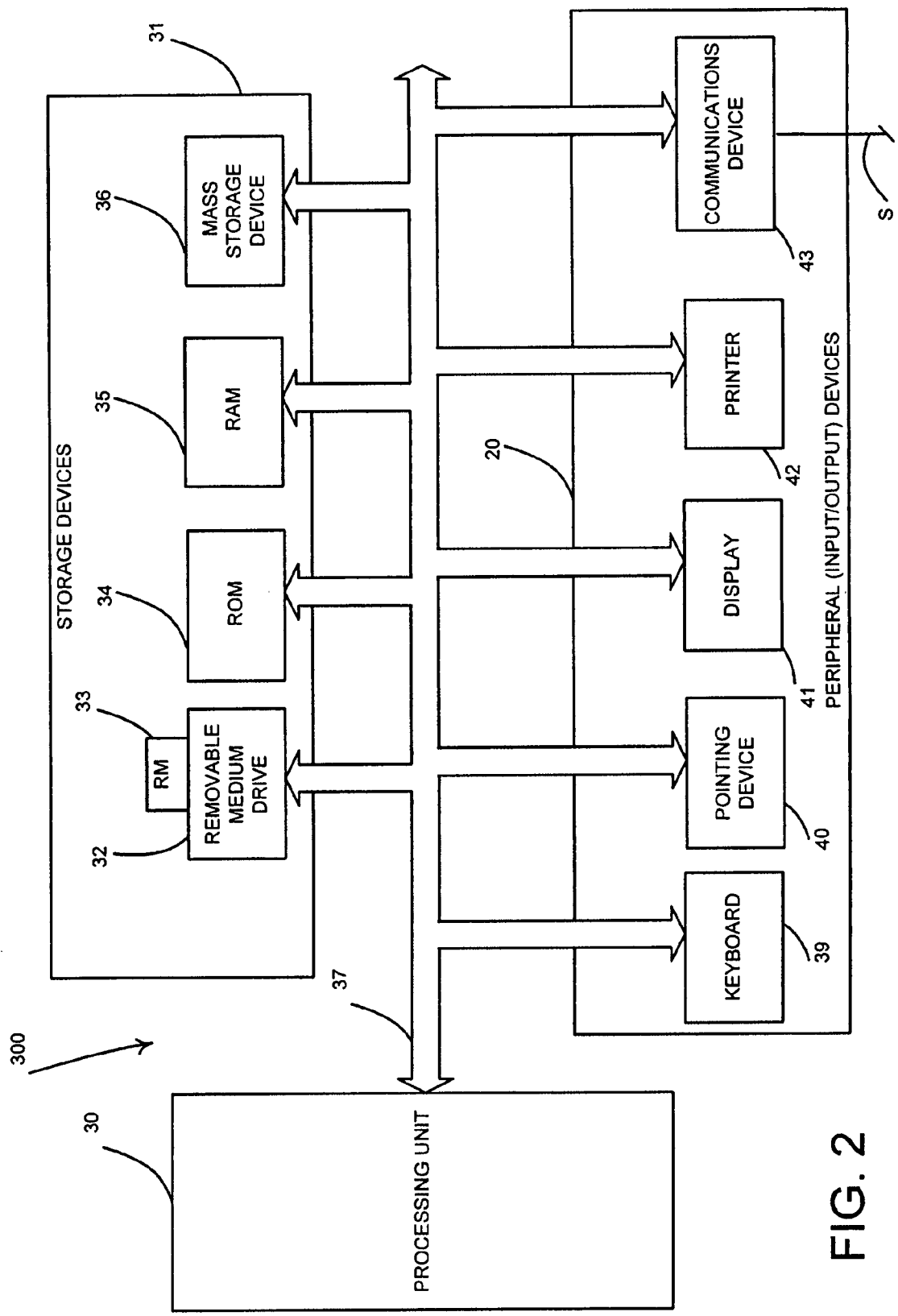
FIG. 2 shows a functional block diagram of computing apparatus that may be programmed to provide the copying apparatus shown in FIG. 1.

FIG. 2 shows a functional block diagram of computing apparatus 300 that may be programmed by program instructions to provide the copying apparatus shown in FIG. 1.

The computing apparatus 300 comprises a processing unit 30 coupled by one or more buses 37 to storage devices which comprise a removable medium drive 32 for receiving a removable medium RM 33 (in this case a DVD drive for receiving a DVD), a read only memory (ROM) 34, a random access memory (RAM) 35 and a mass storage device 36 such as a hard disc drive. The mass storage device 36 may be of a type and size capable of storing copied DVD multimedia data files from many different DVDs.

The bus 37 also couples the processing unit to a number of peripheral input/output devices forming the user interface 20, in this case a keyboard 39, a pointing device 40 and a display 41. The peripheral devices may also include a communications device 43 to provide network communication and, optionally, a printer 42. The communications device 43 may be, for example, a MODEM, network card or the like for enabling the computing apparatus 300 to communicate over a network which may be the Internet but could alternatively or additionally be an intranet, a local area network, wide area network or any other suitable form of network.

It will, of course, be appreciated that the storage devices and input/output devices may not comprise all of those shown in FIG. 2 and/or could comprise additional devices. For example, one or more further removable medium drives, such as a floppy disc drive, may be provided and other input/output devices such as a microphone and a loudspeaker may be provided.

Figure 3:
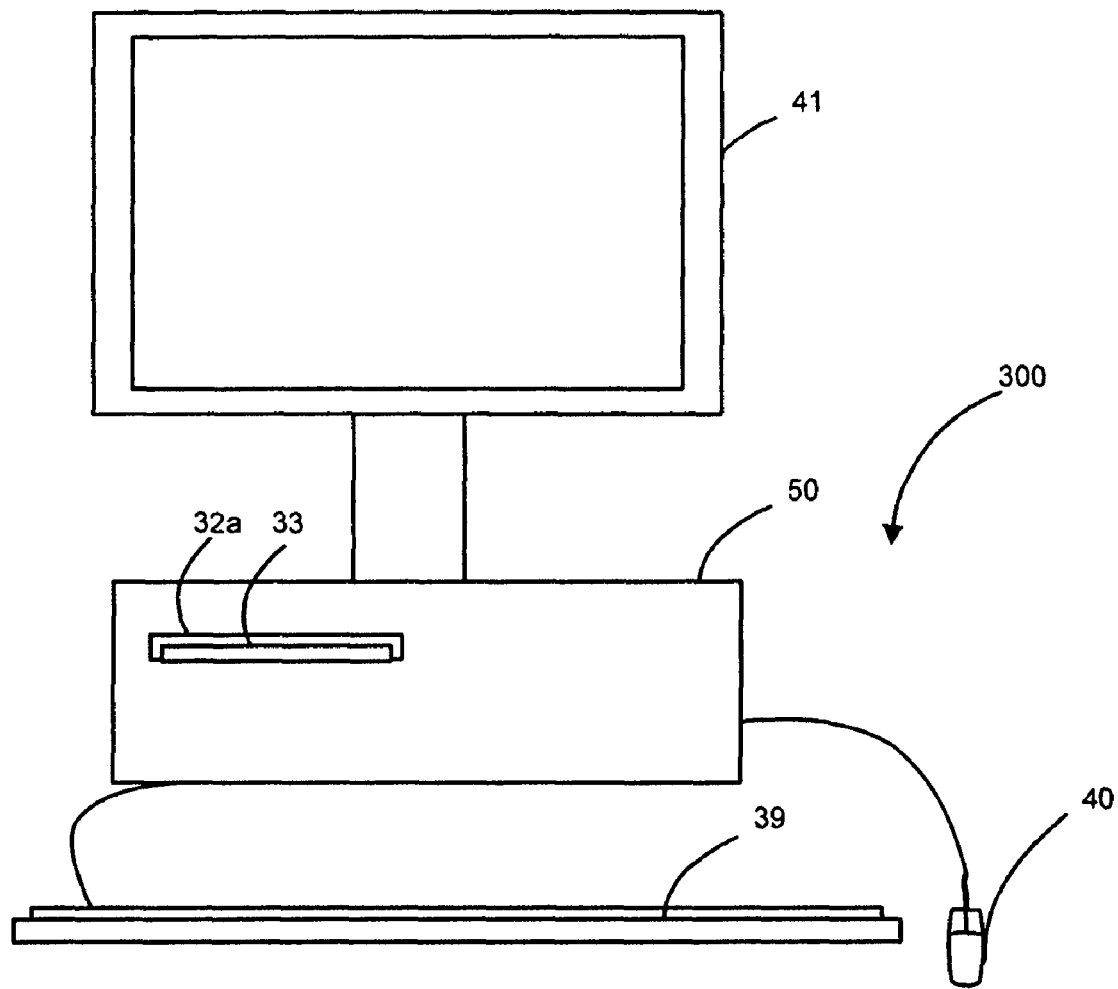
FIG. 3 shows a diagram illustrating an example of computing apparatus having the functionality shown in FIG. 2.

As shown diagrammatically in FIG. 3, the computing apparatus may be a personal computer or server 300a which has a main processor unit 50 containing the processing unit 30 and storage devices 31 and user interface devices in the form, as shown, of a keyboard 39, mouse 40 and display 41. FIG. 3 shows a DVD 33 being ejected from an insertion slot 32a of the removable medium drive 32.

The computing apparatus 300 or 300a may be programmed to provide the copying apparatus 1 shown in FIG. 1 by program instructions supplied by any one or more of the following routes:

1. pre-stored in the ROM 34 and/or or the mass storage device 36;

2. input by a user using an input device such as the keyboard 39 and/or the pointing device 40.

3. downloaded from a removable medium 33 received by the removable medium drive 32; and 4. supplied as a signal S via the communications device 43.

Of course, where the copying apparatus has different physical components, then these may be provided by programming of corresponding respective computing apparatus. For example, at least one of the reader and presentation data generator may be provided by programming, in the manner described above, of a computing apparatus (such as that shown in FIG. 2) separate from the computing apparatus programmed to provide the remainder.

The copying apparatus shown in FIG. 1 facilitates production of a digital copy of content of a DVD video zone even where the DVD video zone incorporates one or more conditional navigation commands that would make it difficult for a static IFO parsing ripper to copy that content.

To facilitate understanding of how the copying apparatus 1 shown in FIG. 1 functions, the structure of a DVD-Video first needs to be discussed.

A DVD-Video comprises a physical data structure and a logical data structure in the form of a logical hierarchy that overlies the physical data structure. The physical data structure determines the manner in which data is organised on a DVD with, in accordance with the DVD standards, data being stored in a sequential and physically contiguous or sequential manner on the DVD. The logical data structure determines the grouping of video sequences and the play back order of blocks of video in a sequence. The data to be recorded on the disc is organised in physical sectors. Each physical sector consists of a SYNC block, a header, a data pack and error detection code. In order to ensure that channel coding rules are met and to minimise the effect of defects on the disc, the data of these sectors have error correction parity codes added and are interleaved in blocks of 16 sectors (an ECC block) before channel coding in accordance with the EFM+ (8 to 16 modulation) channel coding scheme of the DVD format and the channel coded data is stored onto a DVD in the form of pits and lands. When recording the program data, file system information (in accordance with ISO9660/UDF (Universal Disc Format)) is recorded on the disc so that a DVD player can subsequently locate and therefore access each sector of the disc. The final data recorded on a single layer DVD consists of a lead-in section, then the program data section, and then a lead-out section.

Figure 4:
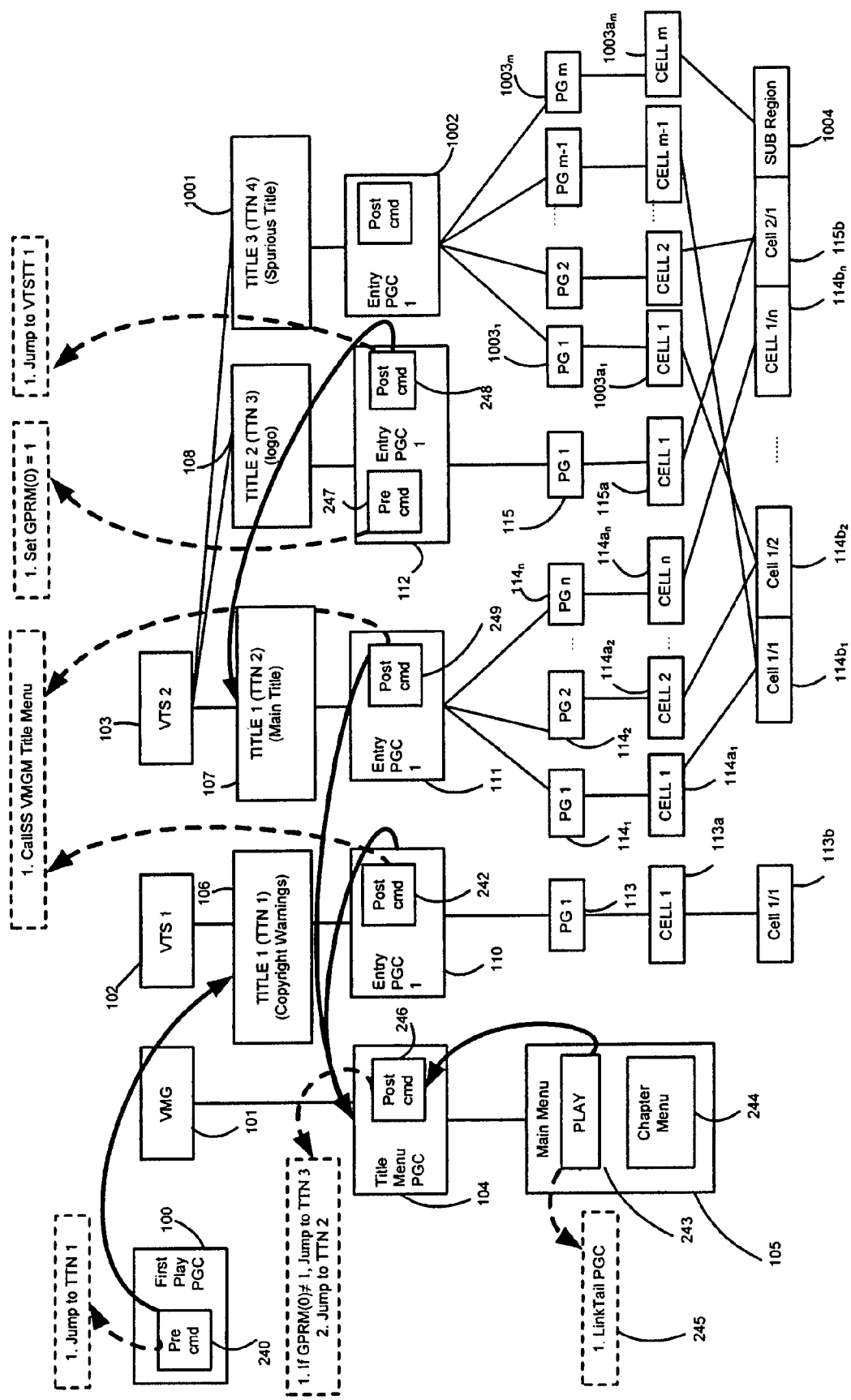
FIG. 4 shows a diagram for explaining the navigation data structure of an example of a protected DVD-Video, where a spurious title within VTS 2 pointing to a subversive region within the VTSTT_VOBS for VTS 2 has been added.
Figure 5:
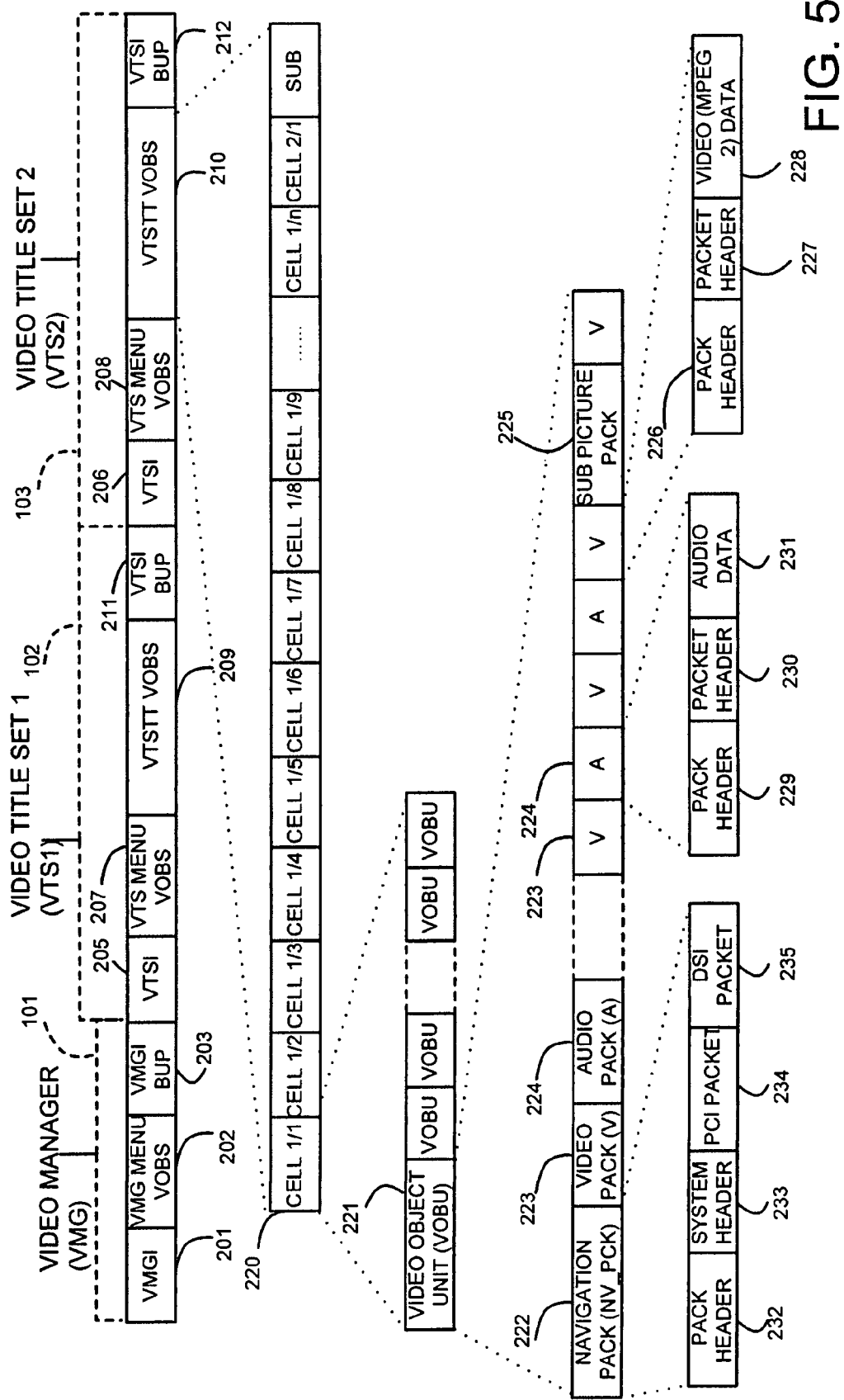
FIG. 5 shows a diagram for explaining the structure of the portion of the physical data structure of a protected DVD multimedia data file corresponding to the DVD video zone.

FIG. 4 shows a diagram for illustrating the navigation data structure of a protected DVD-Video while FIG. 5 shows a diagram for illustrating the structure of the protected DVD Video zone.

As shown in FIG. 4, the navigation data structure comprises a first play program chain (PGC) 100 which is the first program chain to be executed when the disc is first inserted into a DVD player, a video manager (VMG) 101 and one or more video title sets (VTSs).

The video manager 101 provides control information for the entire DVD video zone. In the example shown in FIG. 4, the video manager 101 has a title menu program chain 104 which, as shown, corresponds to the main menu 105. However, the DVD video zone need not necessarily have a title menu.

The number of video title sets will depend upon the particular DVD-Video structure. In the example shown in FIG. 4, there are two video title sets, a first video title set VTS1 102 for introductory data such as copyright warnings and the like and a second video title set VTS2 103 for the main content of the DVD-Video, which content may be a film (movie), music video, or the like.

Each video title set will usually have a language folder and one or more title folders. The language folder is associated with one or more menu program chains (PGCs) for providing menus to be displayed to the user to enable the user to select various options such as language, cut, aspect ratio (widescreen or not) and so on, while the title folder is associated with at least one title program chain (a title may contain up to $2^{15}$ program chains). For simplicity, FIG. 4 shows only the title folders. In the example illustrated, the first video title set VTS1 102 has a single title folder 106 (Title 1 (TTN 1)) for copyright warnings and the like while the second video title set VTS2 103 has three title folders 107 and 108 (Title 1 (TTN 2), Title 2 (TTN 3) and Title 3 (TTN 4)) with title folder 107 being for the main title (that is the film, video or the like) and title folder 108 being for logo data, for example the producer logo or the distributor logo or the like. TTN 4 is a spurious title pointing to a subversive region within the VTSTT_VOBS.

Each title folder 106, 107 and 108 has at least one program chain (PGC). The first program chain in a video title set is known as the entry program chain ("entry PGC"). As shown in FIG. 4, each title folder has a single program chain 110, 111 and 112. The program chains 110, 111 and 112 therefore form the entry PGCs.

Each program chain comprises program chain information (PGCI) comprising navigation data which controls access to components of a program chain and contains from 0 to 99 programs (PG). A program chain may contain no programs but only PGCI. Such a program chain is known as a dummy program chain. For example, the first play program chain is a dummy program chain.

As an illustration, FIG. 4 shows the program chain 110 as having a single program (PG 1) 113, the program chain 111 as having n programs (PG 1 to PG n) $141_1$ to $114_n$ and the program chain 112 as having a single program (PG 1) 115.

Each program has one logical cell or a sequence of logical cells that map to a corresponding physical cell or physical cells of the presentation data structure. In the example of FIG. 4, each program 113, $114_1$ to $114_n$ and 115 has a single logical cell 113a, $114a_1$ to $114a_n$ and 115a. Also, for simplicity in FIG. 4, each logical cell maps to a different physical cell 113b, $114b_1$ to $114b_n$ and 115b.

In addition to the above-described correct navigation data, the navigation data structure shown in FIG. 4 includes subversive navigation data that is intended to inhibit unauthorised copying or at least to render an unauthorised copy difficult to play or of very bad quality. In the example shown in FIG. 4, the subversive navigation data is provided in the form of a spurious title TTN 4 folder 1001 in the second video title set VTS2 103. The spurious title folder 1001 has a program chain 1002 having, in the example shown, m programs (PG 1 to PG m) $1003_1$ to $1003_m$, where m is the same as or similar to n, the number of programs in the main title TTN 2. Each of the m programs $1003_1$ to $1003_m$ has, in the example shown, a single logical cell $1003a_1$ to $1003a_m$. The logical cells $1003a_1$ to $1003a_m$ map to physical cells in a manner that inhibits unauthorised copying or at least renders an unauthorised copy difficult to play or of very bad quality.

As can be seen from FIG. 4, the spurious title folder 1001 is not part of any navigation path of the navigation structure. The logical cells $1003a_1$ to $1003a_m$ of the spurious title folder 1001 point to data that- makes an unauthorised copy difficult to play and/or to watch. For example, as shown in FIG. 4, the logical cells $1003a_1$ to $1003a_{m-1}$ may point to the cells referenced by the main title folder 107 but in a different order and at least one or some of the logical cells (logical cell $1003a_m$ in FIG. 4) may map to a physical cell or cells forming a subversive region ("SUB") 1004 that contains subversive data that detrimentally affects the production of and/or playability of an unauthorised copy. As an example, such subversive data may subvert the reading capabilities of a drive attempting to read that area. As another possibility, the spurious title folder may contain a larger number of programs then the main title and it may have longer presentation time. These techniques may be used individually or in any combination. Examples of subversive data that may be used are described in, for example WO02/11136, WO00/74053, WO01/61696 and WO01/61696, the whole contents of each of which are hereby incorporated by reference.

It will of course be appreciated that FIG. 4 is a much simplified example and that a DVD-Video may contain more video title sets and that a video title set may contain many more titles, program chains, programs and cells than are shown in FIG. 4. Also the mapping between logical and physical cells need not be one to one and the physical cells may well be ordered differently from the logical cells.

FIG. 5 shows the DVD Video zone corresponding to the DVD-Video whose navigation structure is shown in FIG. 4. The video manager (VMG) consists of video manager information (VMGI) 201 comprising navigation data for the entire zone in a single file identified as VIDEO_TS.IFO, a video manager menu video object set (VMG MENU VOBS) 202 provided as a single file identified as VIDEO_TS.VOB, and a back up file of the video manager information (VMGI BUP) 203 in a single file VIDEO_TS.BUP. The video manager menu video object set usually includes the presentation data for the title menu and any other non-dummy menu program chains.

Each video title set (VTS) 102 and 103 consists of video title set information (VTS1) 205 and 206 comprising navigation data to control the presentation of titles and menus in the video title set in a single file VTS_##_0.IFO (where ## represents a two digit number between 01 and 99 representing the video title set number), a video object set 207 and 208 for any video title set menu (VTS MENU VOBS) which typically contains the content for all types of menu within the video title set in a single file VTS_##_0.VOB (as in the example shown in FIG. 4 there may be no menus within the VTS and so no VTS MENU VOBS) followed by a video title object set (VTSTT VOBS) 209 and 210 for the video title set in one or more files identified as VTS_##_@.VOB (where @ is single digit number between 1 and 9) and a back up of the video title set information (VTSI BUP) 211 and 212 in a single file identified as VTS_##_0.BUP.

Each video object set (VOBS) consists of a sequence of physical cells. For clarity in the diagram, FIG. 5 shows part of the cell set (CELL1/1 to CELL 1/n) only for the video title object set 210 of the video title set 2 (VTS2) 103. Each cell consists of one or more video object units (VOBUs) which each represent approximately 0.4 to one second of playback time (that is a number of consecutive frames). For simplicity in FIG. 5 the structure of only one cell 220 and one VOBU 221 of that cell is shown.

As shown in FIG. 5 for the video object unit 221, each video object unit consists of a navigation pack (V_PCK) 222 followed by an integer number of video (V), audio (A) and sub-picture (S) packs 223, 224 and 225. On a DVD video disc, each pack occupies one sector of user data on the disc (2048 bytes). Each video pack 223 consists of a pack header 226 identifying the pack followed by a packet header 227 identifying the packets within the pack and then the video data 228 in accordance with the DVD video format, that is MPEG2 format. Similarly, each audio pack consists of a pack header 229 identifying the pack followed by a packet header 230 identifying the packets within the pack and the audio data 231 which may be in any format appropriate for DVD, for example MPEG, DTS, DD, LPCM, AC3.

Each navigation pack (NV_PCK) 222 consists of a pack header 232 identifying the pack, followed by a system header 233 and two navigation data packets 234 and 235. The first of the two packets 234 comprises presentation control information (PCI) for controlling control menu display and program presentation in real time and the second packet 235 comprises data search information (DSI) for controlling forward/reverse scanning and seamless branching. DVD players contain a track buffer to enable variable rate and seamless playback. There is therefore a time delay reading by the read head and decoding and playing of the audio and video data. Therefore real time control information is distributed between and stored within the PCI and DSI packets and the player checks and utilises this information before and after the corresponding cell passes through the track buffer. Navigation packs 222 are thus used by the navigation engine or navigator of the DVD player to ensure playback, trick play modes and search operations are executed successfully and in a timely manner.

It will be understood from the above that the DVD video zone thus includes navigation data that controls access and interactive playback and that navigation data exists at different levels within the DVD video zone. The navigation data includes control commands (for example for format, language, audio selection, sub-picture selection, parental management, display mode and display aspect), navigation commands (for example for general system parameters, system parameters, navigation timer and menu buttons), and search and user interface commands (for example for PGCI searches to enable selection of a particular menu or presentation data searches enable selection of a title, part of title (chapter), and so on).

The video Manager Information (VGMI) comprises navigation data such as, for example: the number and attributes of title sets; pointers to titles; a parental management table; attributes of the title menu (VMGM) video stream, audio stream and sub-pictures; and title menu cell pointers and VOBU maps. The video title set information (VTSI) of a video title set comprises navigation data such as, for example: pointers to chapters; pointers to program chains; time maps; attributes of root menu (VTSM) video stream, audio stream and sub-pictures; root menu cell pointers and VOBU maps; and video title set pointers and VOBU maps.

In a program chain, the program chain information (PGCI) comprises navigation data such as, for example: the number of the programs within the chain; prohibited user operations; links between program chains; playback mode; pre-commands to be executed before accessing any of the programs of the chain; cell commands; and post-commands to be executed after accessing the programs of the chain.

In a video object unit, the presentation control information (PCI) comprises navigation data such as, for example: prohibited user operations, button information, non-seamless angle jump pointers, and presentation times while the data search information (DSI) comprises navigation data such as, for example: presentation times, audio gap lengths, VOBU pointers for forward and reverse scanning, video synchronisation pointers to audio and sub-picture packs reference picture pointers, link to next interleaved unit, and seamless angle jump pointers.

In a program chain, navigation commands can be included as pre-commands to be executed before reading any cell(s) of the program chain and/or as post-commands to be executed after reading the cell(s) of the program chain. The cells of a program chain may also each have one optional navigation command. Program chain navigation commands include "go to" instructions to go to a command number, "link to" instructions to program chain number, part of title number, cell number and so on, "jump" instructions to move out of the current domain or state of the DVD playback, and SPRM and GPRM setting and manipulating instructions and "comparison" instructions, so allowing conditional actions, for example allowing a "go to" or "jump" instruction to be executed in the event a certain comparison is true or a certain SPRM or GPRM parameter is set to a certain value.

It will, of course, be appreciated that the above is a very simple overview of the DVD format and recording process and that for a more detailed description of the DVD format and recording process, reference should be made to the publicly available DVD standards. However it should be clear from this simple overview that a DVD has a complex and non-linear structure with multiple elementary streams being interleaved and multiple discrete elements of content organized in a structured and hierarchical manner within the DVD video zone and that navigation to and through the stored digital content is controlled by the navigation data which may be present at different levels in the physical data structure. The presentation data of a DVD video zone thus cannot be played simply by a player accessing the recorded data in sequential manner from the beginning to the end of the recording of the data on the DVD. Rather, the navigation path or paths taken through the content by the player depends upon the navigator of the player, the way the disc is authored, and interaction with the user.

The navigational data recorded with the content data on a recording medium defines the navigational path that a player follows through the content data recorded on the recording medium. The inventors have invented a copy-protection technique that incorporates into the navigational information recorded on a recording medium at least one conditional navigation command which causes the navigational path through the content data recorded on the recording medium to be defined dynamically as the recording medium is being played by the player and results in the correct navigational path being followed only if the player meets a criterion required by the conditional navigational command. For example, in an embodiment, in order for the correct navigational path to be followed, a value stored by the player must match a value set by the conditional navigation command and that value may be set only once a certain action associated with the playing of the recording medium has occurred, for example the value may be set as the player commences playing the recording medium or in response to a user selecting a menu option. Where the criterion required by the conditional navigational command is not met, then that conditional navigational command may point to incorrect data, for example comprising any one or more of: false content data; blank content data; the correct content data in the wrong order; only part of the content data; subversive data that detrimentally affects the ability of a copying apparatus to produce a playable copy recording medium. Examples of subversive data that may be used are described in, for example WO02/11136, WO00/74053, WO01/61695 and WO01/61696, the whole contents of each of which are hereby incorporated by reference. Another possibility may be to deliberately damage areas of the DVD containing the incorrect program chains which may make any copy DVD unplayable.

The incorporation of such conditional navigational commands makes it difficult for a ripper or other unauthorised accessing apparatus to identify the content data to be copied by static analysis and, where the conditional navigational command points to incorrect data until the required criterion is met during playing of the recording medium, may even fool the ripper into selecting that incorrect data for copying.

As will be explained below, the copying apparatus described above with reference to FIG. 1 facilitates copying of a DVD video even where that DVD zone has complex navigational paths and may include some false or incorrect navigational paths that if followed will lead to incorrect data, muddled or disordered data or subversive data that detrimentally affects the copying process or the playability of any copy DVD including that subversive data.

Figure 6:
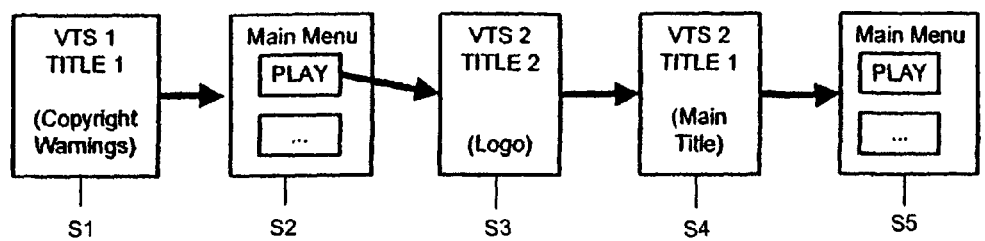
FIG. 6 illustrates the navigation sequence of the example of DVD-Video shown in FIG. 4.

In order to explain the difference between a copying apparatus embodying the invention and a conventional ripper, the operation of copying apparatus embodying the invention will first be explained with reference to a DVD-Video for which the author has defined a relatively straightforward navigational path or sequence as shown by FIG. 6 so that, when the DVD is played, the player will at S1 display the copyright warning, then at S2 display the main menu and, after selection of the play main title button 243, then at S3 display a logo, at S4 play the main title (film or video for example) and, after playing the main title, at return to the main menu.

The navigational path or sequence illustrated by FIG. 6 is provided by navigational commands of the logical data structure shown in FIG. 4.

In FIG. 4, the navigational sequence or path defined by the author is shown by solid arrowed lines in FIG. 4. The dashed arrowed lines in FIG. 4 are simply links to blocks showing the detail of the navigational commands incorporated into the logical data structure to achieve the navigational sequence or path.

As shown in FIG. 4, the first play PGC 100 includes a non-conditional pre-command 240 "Jump to TTN 1" to cause a player to jump to the title 1 (TTN 1) title folder 106 and then to play the copyright warnings of the entry program chain 110 of first video title set 102. The entry program chain 110 has a post-command 242 "CallSS VMGM Title Menu" to cause the player to jump to the title menu PGC 104 of the Video Manager and to display the main menu which in this example has a play button 243 and other menu options 244. A link tail PGC command 245 is provided to cause the player to exit the main menu and then execute a post command 246 of the title menu PGC 104, in response to selection of the play button 243 by a user of the player.

In this example, the post-command area 246 of the title menu PGC 104 contains a conditional navigation command:

If GRPM (0)≠1, Jump to TTN 3
Jump to TTN 2 to cause the player to jump to the logo or second title folder (TTN 3) 108 of the second video title set (VTS 2) 103 if the value of the zeroth general parameter GPRM(0) in the GPRMs register of the player is not equal to 1 and to cause the player to jump to the main title or first title folder 107 of the second video title set (VTS 2) 103 if GPRM(0) is equal to 1.

The entry PGC 112 of the logo or second title folder (TTN 3) 108 of the second video title set (VTS 2) 103 has a pre-command 247 to cause the player to set GPRM(0) to 1 and a post command 248 "Jump to VTSTT 1" to cause the player, after displaying the logo, to access the main title folder 107 and play main title programs PG1 to PGn. The entry PGC 111 of the main title folder 107 has a post-command 249 "CallSS VMGM Title Menu" to cause the player to return to the main menu 105, after playing the main title programs PG1 to PGn in accordance with the navigation commands of the entry program chain 111 and the programs.

When GPRM(0) is set to 1, the post command 246 of the title menu PGC 104 is operable to cause the player to jump to the main title folder 107. Accordingly, this DVD zone is authored so that when the main menu is redisplayed after the film or video has been played, the user can play the film or video again without redisplaying the logo.

Figure 7:
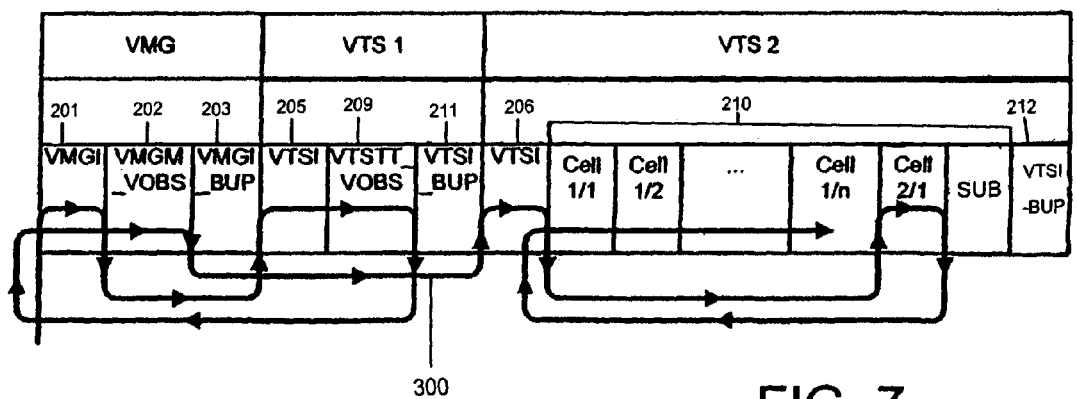
FIG. 7 illustrates the navigation path taken by a legitimate player through the DVD multimedia data file or DVD video zone shown in FIG. 4.

FIG. 7 shows the navigation path taken by a legitimate player through the DVD video zone described above with reference to FIGS. 4 and 6. As can be seen from FIGS. 4 and 7, when a disc carrying this DVD video zone is inserted into a legitimate player, a navigation engine or navigator of the legitimate player first loads the Video Manager information (VMGI) 201 and executes the pre-command 240 of the first play PGC causing the player to jump to the video title set information (VTSI) 205 of video title set 1 (VTS 1), to access the video title sets video object units (VTSTT_VOBS) 209, to display the copyright warning and then, in accordance with the post command 242 in the VTSI of VTS 1, to return to the video manager VGMI 201 and to display the main menu by accessing VMGM_VOBS 202. In response to selection of the play button, the link tail PGC of the VMGI 201 causes the player to execute the post command 246 and to jump to the video title set information VTSI 206 of VTS2. The pre-command 247 of the VTSI 206 then causes the player to set GPRM(0) to 1, whereafter the player reads the cell(s) of the VTSTT VOBS 210 (in this case cell 2/1) to display the logo to the user and then executes the post command 248 of the VTS1 causing the player to jump to TTN 2 and to access and so play the cells of the VTSTT VOBS 210 (in this case cells 1/1 to 1/n) containing the main title. Although not shown on FIG. 7, thereafter the post-command 249 causes the player to return to the main menu as described above.

Figure 8:
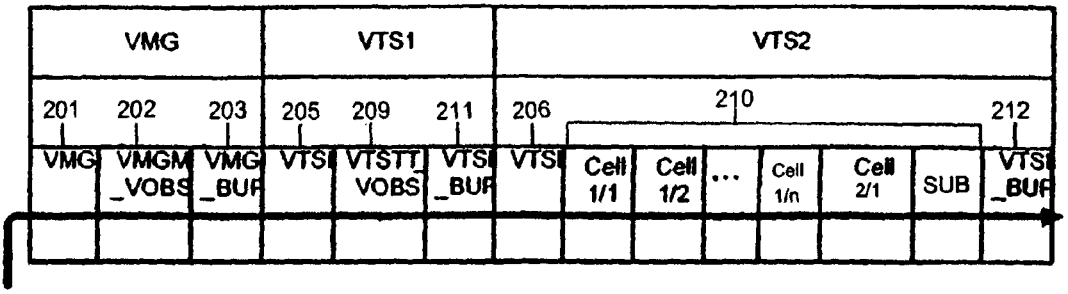
FIG. 8 illustrates, for comparison purposes, the navigation path that would be taken by a sector-by-sector or file-by-file ripper through the DVD-Video shown in FIG. 4.

A legitimate player will thus never access the subversive data SUB. If, however, a sector-by-sector/file-by-file ripper were to try and "rip" the content of a DVD carrying the DVD video zone described above with reference to FIG. 4, then, as shown in FIG. 8, that ripper would simply access the sectors or files of the DVD in the sequence in which they were recorded which will include the sectors or files that contain the subversive data SUB.

Figure 9:
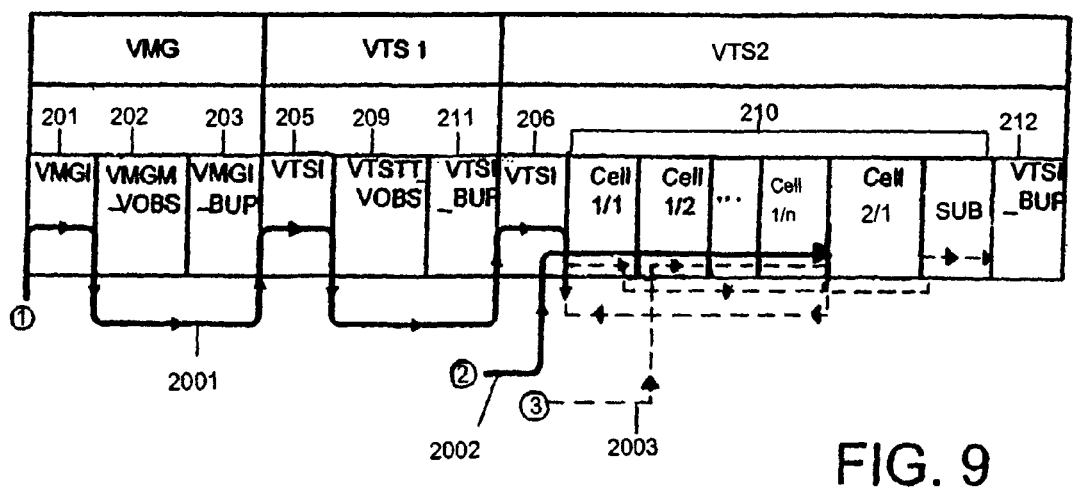
FIG. 9 illustrates, for comparison purposes, navigation paths that may be taken by an IFO parsing ripper through the DVD video zone corresponding to the DVD-Video shown in FIG. 4.

If, as another possibility, an IFO parsing ripper were to try and rip the content of a DVD carrying the DVD video zone described above with reference to FIG. 4, then as illustrated by FIG. 9, that IFO parsing ripper would first follow the path labelled 2001 to access the navigation information (VMGI and VTSI for each VTS) contained in the IFO tables in order to retrieve information regarding the various titles contained in the DVD and then choose a candidate for the main title. In the example illustrated by FIG. 4, the main title TTN2 and the spurious title TTN4 are of similar if not identical size and therefore the ripper may have difficulty in deciding which title to select for ripping. Thus, in the example shown in FIG. 4, instead of selecting the main title TTN 2 and so following path 2002 in FIG. 9 to access in turn the cells pointed to by Title 1 in VTS 1 (cell 2/1 would not be accessed if Title 2 is not selected for ripping), the ripper may select the spurious title TTN4 and so follow will follow the dashed path 2003 in FIG. 9, thereby accessing legitimate cells in the wrong order and also accessing the subversive data SUB.

Thus, both the sector-by-sector/file-by-file and the IFO-parsing ripper may produce a copy DVD that contains subversive or corrupted data and may be difficult or impossible to play or of bad or unwatchable quality. In contrast, as will be explained below, the copying apparatus shown in FIG. 1 should, because it emulates a legitimate player, avoid any subversive or corrupted (for example misordered) data.

Figure 10A:
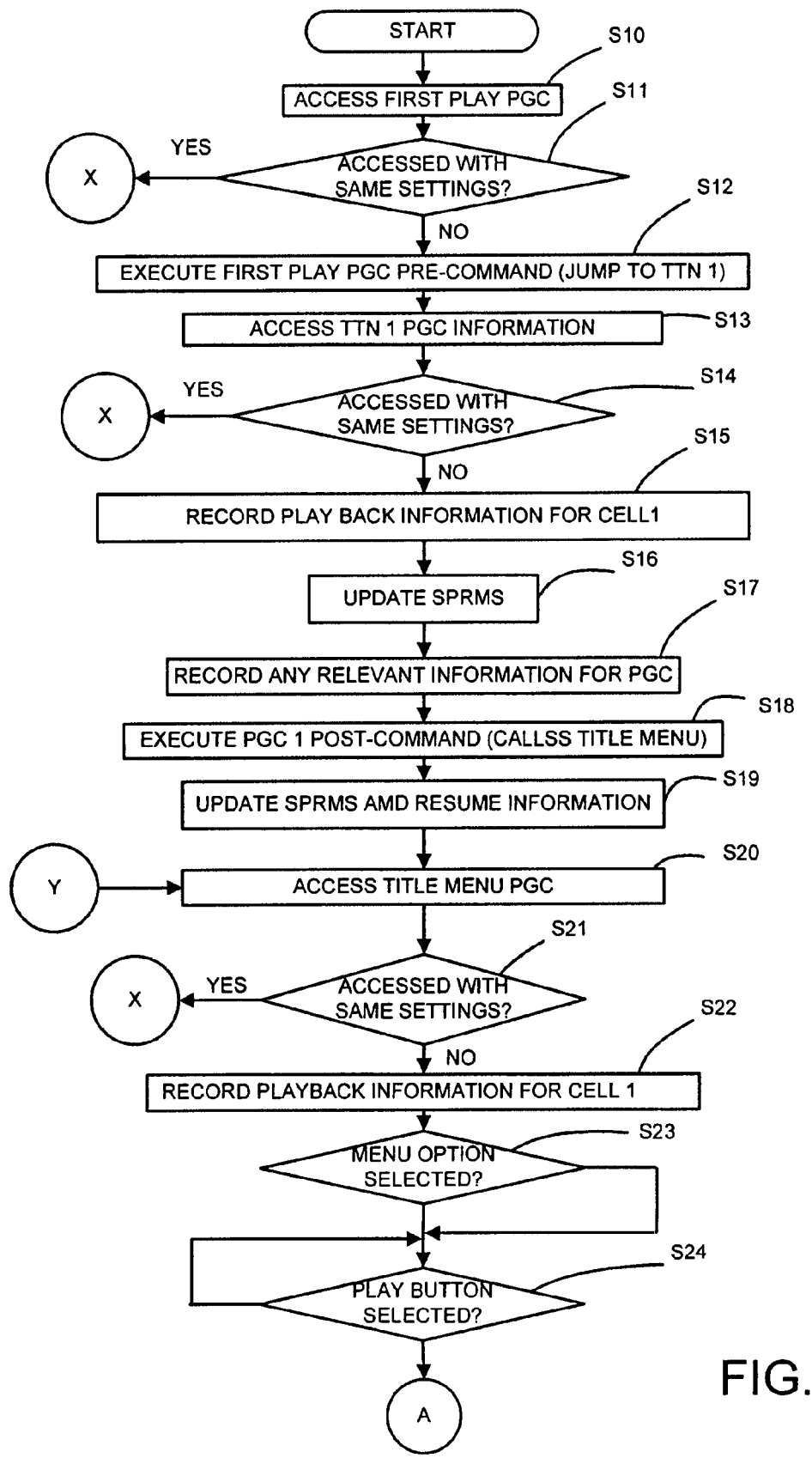
FIG. 10 comprises FIGS. 10a to 10c and shows a flowchart for illustrating processes carried out by the copying apparatus shown in FIG. 1 to produce a digital copy of digital content carried by an optical disc such as a DVD-Video.
Figure 10B:
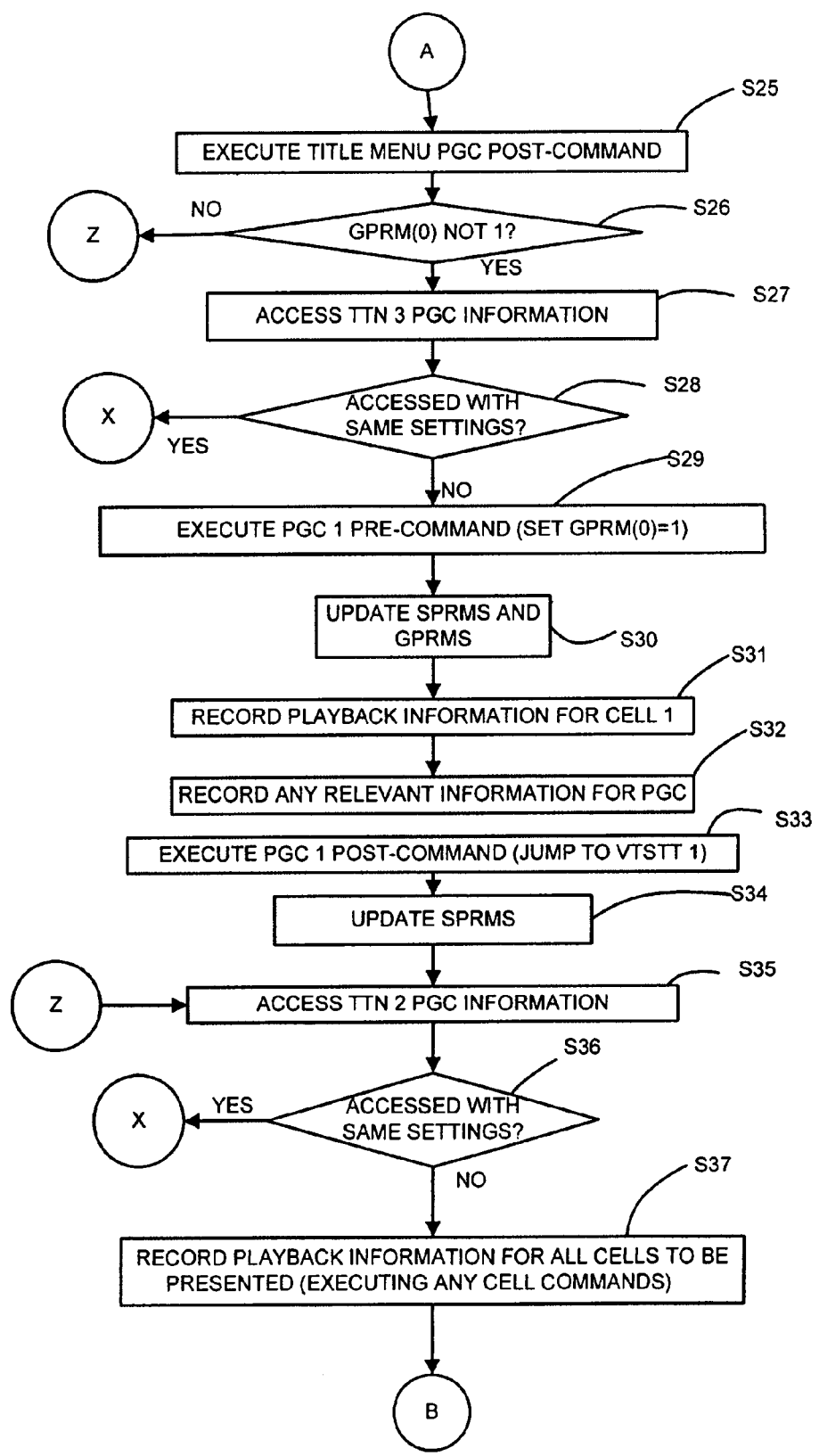
Figure 10C:
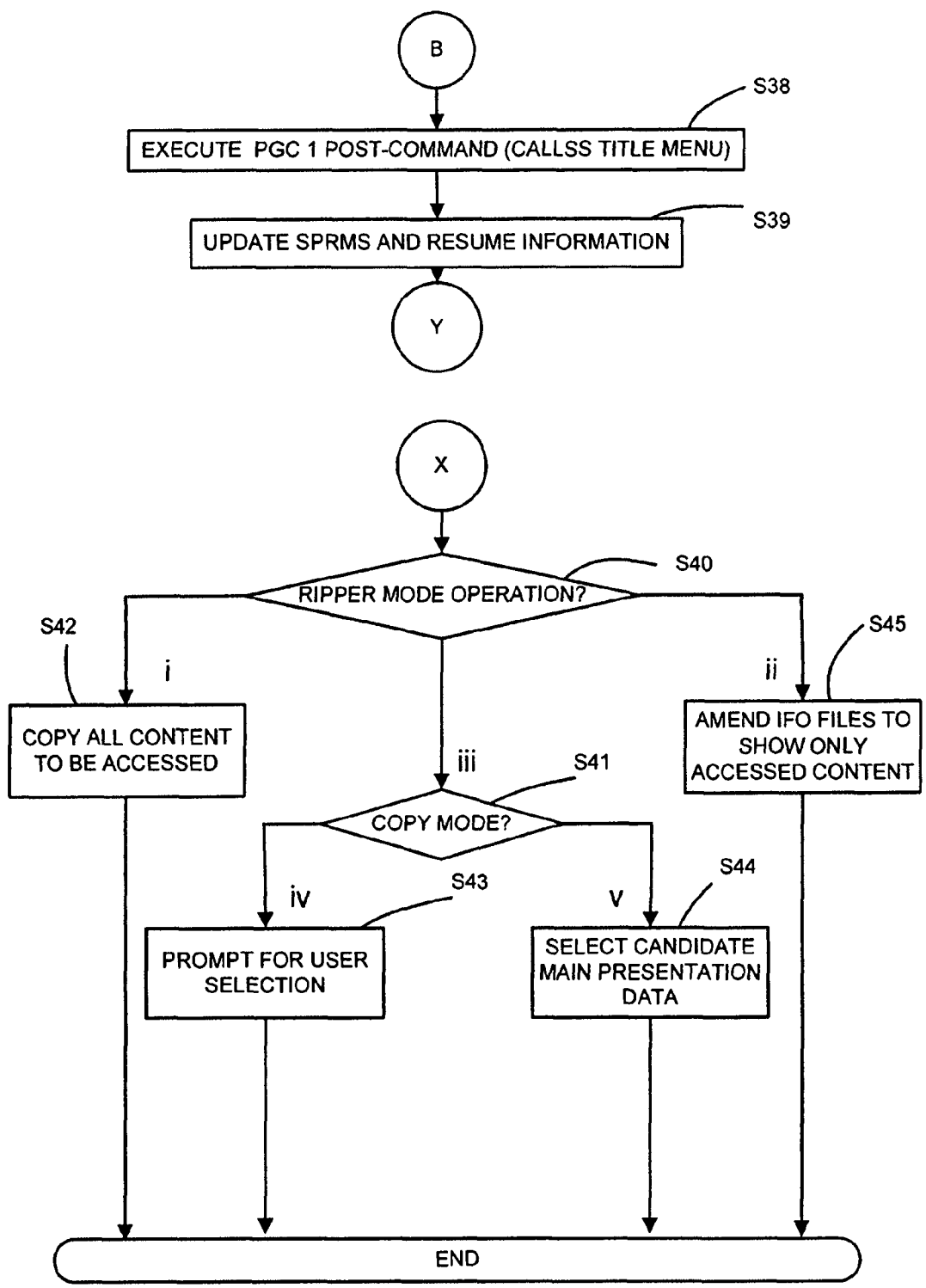
Figure 11:
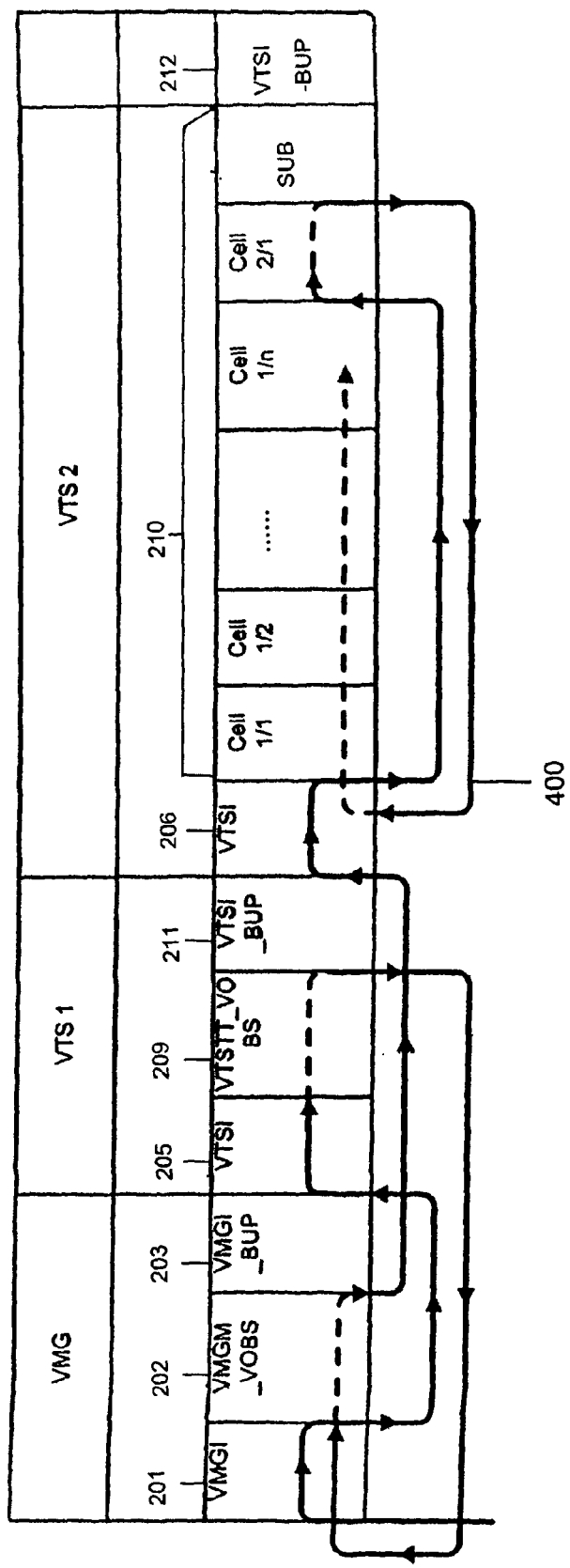
FIG. 11 illustrates the navigation path taken by the copying apparatus shown in FIG. 1 through the DVD multimedia data file or DVD video zone shown in FIG. 4.

FIG. 10 shows a flow chart for explaining how the copying apparatus shown in FIG. 1 operates to produce a copy of at least a main title from a DVD carrying a DVD zone as described above with reference to FIG. 4 while FIG. 11 illustrates the navigation path taken by the copying apparatus shown in FIG. 1 through that DVD multimedia data file or DVD video zone.

Initially, the controller 5 may prompt the user via the user interface 20 to insert the DVD from which the user wishes to copy content into the removable medium drive of the copying apparatus so that the reader can read the DVD. At S 10, the controller 5 controls the reader 9 to read the file system information of the DVD-Video so as to identify the location on the DVD of the video manager information VGMI to enable the reader to access the first play PGC information. When the controller 5 determines that the data received from the reader is the first play PGC, the controller 5 then checks at S11 whether the first play PGC has already been accessed with the same settings of the GPRMs and SPRMs registers by checking for previous states of the GPRMs and SPRMs registers stored in the memory of the navigation controller 24. If the answer had been yes, then the controller 5 would have determined that all possible navigational paths through the DVD video zone had already been accessed and would have proceeded to carry out the final copying operation of S40 to S45 to be described below. However as this is the first time the first play PGC has been accessed, the answer is NO and so the controller 5 causes the logical processing unit 24a to execute the pre-command associated with the first play PGC, namely "Jump to TTN 1" at S12, thereby causing the controller 5 to instruct the reader 2 to access the first video title set 102 (in this case the copyright warnings).

The controller 5 then accesses the TTN 1 PGC information for the first video title set 102 read by the reader and at S13 and checks at S14 whether the TTN 1 PGC has been accessed before with the same settings of the GPRMs and SPRMs registers by checking for previous states of the GPRMs and SPRMs registers stored in the memory 24' of the navigation controller. If the answer had been yes, then the controller 5 would have determined that all possible navigational paths through the DVD video zone had been investigated and would have proceeded to carry out the final copying operation of S40 to S45 to be described below. However as this is the first time the TTN 1 PGC has been accessed, the answer is NO and so the controller 5 causes at S 15 the reader 2 to read the playback information (which includes content data comprising the copyright warnings) for the first title TTN 1 106 and to cause the presentation data storer 13 to store this data. Alternatively, information such as address information for this data may be stored by the presentation data storer.

The controller 5 parses the playback data being read, passing any general control data, search control data, user interface control data and navigation control data to the general control data determiner 21, search control data determiner 23, user interface control data determiner 22 and navigation control data determiner 24, respectively, so that, where appropriate or desired, the user can interact with the DVD being copied in the same manner as he or she would if the DVD were being played by a player and so that the navigation controller can access this navigation data in order to prepare navigation data for the copy being produced.

At S16 the navigation controller 24 updates the SPRMs registers and at S17 records any relevant information for the PGC from the PGC information table within the VTSI. For example, information regarding the chapter boundaries may be recorded.

The navigational controller 24 then (S18) executes the post-command 242 of the entry PGC 1 110, namely CallSS VMGM Title Menu, updating (S19) the SPRM registers and resume information with any changes resulting from the execution of the post-command 242, before accessing (S20) the title menu PGC 104. For example, the SPRMs for the title number TTN, the VTS number VTSN, the VTS title number VTS_TTN may be updated.

At S21, the navigation controller 24 checks whether this is the first time the Title Menu PGC has been accessed with the same settings of the GPRMs and SPRMs registers by checking for previous states of the GPRMs and SPRMs registers stored in the memory 24' of the navigation controller 24. If the answer had been yes, then the controller 5 would have determined that that all possible navigational paths through the DVD video zone had been investigated and would have proceeded to carry out the final copying operation of S40 to S45 to be described below. However, as the answer is NO, the controller 5 causes at S22 the reader to read the playback information for the cell(s) of the title menu PGC and stores this playback information as title menu playback information in the presentation data storer 13.

As mentioned above, the controller 5 passes user interface control data to the user interface control data determiner 22 which may, under the control of the controller 5, display any menus to the user so that the user can select a menu option. As another possibility, the interface control data determiner 22 may select a menu option automatically. Alternatively, all navigation paths generated by the different menu options may automatically be considered.

At S23, the controller 5 waits for selection of a menu option and once a main option has been selected or no menu option is selected after a predetermined time, then waits at S24 for selection of the play button. If the user or the navigation controller 24 selects a menu option at S23 to change the default settings or the DVD video zone (for example to alter the option settings such as the language, aspect ratio, cut and so on) which will generally cause modification of the navigational path, then the navigation controller 24 at S23a stores the current SPRMs and GPRMs register values as previous state register values in memory and updates the current SPRMs and GPRMs in accordance with the selected menu option.

If the play main title button has been selected via the user interface (or an action simulating selection of the play button has occurred) at S24, the LinkTail PGC causes the navigation controller 24 to exit from the main menu and to execute at S25 the title menu PGC 104 conditional post-command 246:

If GRPM (0)≠1, Jump to TTN 3

Jump to TTN 2

The logical processing unit 24a of the navigation controller 24 then checks the value of GPRM(0) in its GPRMs register 24d at S26.

As GPRM(0) is not equal to 1, then at S27 the navigation controller 24 causes the controller 5 to control the reader 2 to access the TTN 3 PGC information on the DVD. The controller 5 parses the read information passing navigational data to the navigational controller 24 as above.

At S28, the navigation controller 24 checks whether the TTN 3 PGC has been accessed before with the same settings of the GPRMs and SPRMs registers by checking for previous states of the GPRMs and SPRMs registers stored in the memory of the navigation controller. If the answer had been yes, then the controller 5 would have determined that all possible navigational paths had been investigated and would have proceeded to carry out the final copying operation of S40 to S45 to be described below. However, as the answer is NO, the controller 5 causes the navigation controller 24 to execute the PGC 1 pre-command 247 "Set GPRM(0)=1" at S29 and to update its SPRM and GPRM registers 24c and 24d at S30. Then at S31 and S32, the controller causes the presentation data generator 6 to record playback information for the cell(s) (in this example shown in FIG. 4 there is only one) of title TTN3 and the navigational controller 24 to record any relevant information for the PGC, such as the number of chapters, the presentation time, etc.

Then at S33, the navigational controller executes the PGC 1 post-command 248 "Jump to VTSTT 1" causing the reader 2 to access the main title folder 107. At S34, the navigation controller updates its SPRMs register 24c, if necessary, and at S35 accesses the TTN 2 PGC information.

The navigation controller 24 then checks at S36 whether the TTN 2 PGC information has previously been accessed with the same settings of the GPRMs and SPRMs registers by checking for previous states of the GPRMs and SPRMs registers stored in the memory of the navigation controller. If the answer had been yes, then the controller 5 would have determined that all possible navigational paths of the content of the DVD has already been investigated and would have proceeded to carry out the final copying operation of S40 to S45 to be described below. However, as the answer is NO, the controller 5 causes at S37 the reader 2 to read the playback information for all cell(s) of the main title PGC 111, passing any cell commands to the navigation controller for execution, and storing this playback information as the main title playback information in the presentation data storer 13.

Then at S38, the navigation controller executes the PGC 1 post-command (CallSS Title Menu) 249 of the entry PGC 111 of the main title folder 107, updates its SPRMs registers and resume information at S39 and returns to S20. For example, the SPRMs for the title number TTN, the VTS number VTSN, the VTS title number VTS_TTN may be updated. The navigation controller then repeats processes S21 to S39 until all of the possible navigational paths (defined for example by selection of menu options as discussed above) have been investigated. In the simple example shown in FIG. 4 there is of course only one navigation sequence defined by the author. However, a DVD zone may have a number of different navigation sequences or paths defined by, for example, user menu selections, such as different viewing angles, different cuts, different languages etc. As will be appreciated from the above description of FIG. 10, the copying apparatus shown in FIG. 1 allows all navigational paths of the DVD video zone to be investigated and the corresponding playback data to be recorded.

The copying process described above with respect to FIG. 10 enables all of the different navigational paths through the DVD defined by the various menu selectable options provided by the author to be investigated. FIG. 10 shows only one point at which menu options are available. It will however be appreciated that there may be other points within the DVD video zone at which menu options are available. The checking of the current GPRMs and SPRMs register settings at S11, S14, S21, S28 and S32 in FIG. 10 is included to ensure that a navigation path investigation is terminated if the same PGC is accessed a second time with the navigation controller in exactly the same state (that is the SPRMs and GPRMs are the same), that is to ensure that the navigation path investigation is terminated once all the navigation paths defined by the author have been investigated, so as to avoid the possibility of the copying apparatus getting into an infinite loop.

At S39 in FIG. 10, the presentation data storer 13 will have stored the sequence of program chains with their actual content data (or its location on the DVD) for each navigational path through the DVD video zone (of course in the simple example of FIG. 4, there is only one navigational path) defined by the author of the DVD and the navigational controller will have any relevant program chain information for each program chain. As another possibly, rather than record the playback data at S31 and S37 in FIG. 10, the copying apparatus may simply store details of the location of that data on the DVD being copied so that the playback data need only be copied and recorded once the user of the copying apparatus is ready to produce a copy DVD and/or once the user has selected the titles to be copied. This means that the presentation data storer 13 need not store all the presentation data for each navigational path but only the locations of that data on the DVD, until the user or copying apparatus is ready to create a copy DVD.

The controller 5 then checks at S40 which ripper mode is required. The ripper mode may be pre-selected by the navigation controller or may be selected by the user as a result of a prompt displayed on the user interface 20. If ripper mode i is selected, then the controller 5 causes at S42 all of the accessed content of the DVD video zone to be copied by the presentation data generator onto a recordable DVD or onto hard disc. If, however, ripper mode ii is selected then at S45 the controller 5 may act as a filter driver that alters the data returned by the reader and, in particular, the IFO files information according to the information stored by the presentation data generator, in such a way that only navigation information for the accessed content is shown. In such a case, a static IFO parsing ripper may then be utilised. If ripper mode iii is selected, then the controller 5 checks at S41 whether copy mode iv or v is selected (again this may be pre-selected by the navigation controller or may be selected by the user as a result of a prompt displayed on the user interface 20). If copy mode iv is selected, then the user is prompted at S43 to select which title(s) he or she wishes to be copied by the presentation data generator 6 onto a recordable DVD 8 or onto hard disc whereas if copy mode v is selected, the most likely candidate for the main title (i.e. TTN 3 in the example of FIG. 4) is selected by the controller 5 at S44 to be copied by the presentation data generator 6 onto a recordable DVD 8 or onto hard disc.

As another possibility, as a very first step, the navigator may parse the DVD zone to extract all menus and display these to the user so that the user can select the appropriate buttons to enable emulation by the copying apparatus of the playing of the selections from the DVD video required by the user.

FIG. 11 shows by way of the arrowed line 400 the navigation path taken by the copying apparatus shown in FIG. 1 through the DVD video zone shown in FIG. 4 (the dashed parts of the arrowed line 400 indicate parts of the data that may be recorded or copied or may simply have their locations identified during the navigational path investigation). As can be seen by comparing FIG. 11 with FIGS. 7, 8 and 9, unlike a file-by-file ripper (which accesses the data in the order in which it is recorded as shown in FIG. 8) or a static IFO parsing ripper (which parses the IFO data to identify the main title as shown in FIG. 9), a copying apparatus 1 embodying the invention follows a navigation path through the DVD video zone which is the same as the navigation path of a legitimate player (FIG. 7), apart from the dashed parts of the arrowed line 400 which indicate parts of the data that may be accessed or may simply have their locations identified during the navigational path investigation. Thus, because it follows the navigation path of a legitimate player the copying apparatus does not access the subversive data cell(s) SUB that would be accessed by a file-by-file or sector-by-sector ripper and, unlike an IFO parsing ripper, cannot be fooled into selecting the wrong title folder by including more than one title folder of a size appropriate to a main title on the DVD.

The fact that a copying apparatus embodying the present invention follows the same navigation path through a DVD Video zone as a legitimate player, may not, when compared to a conventional ripper, particularly improve the copying process in the case of a DVD video zone having the very simple navigational structure shown in FIG. 4. However, in practice, the navigational structure of a DVD video zone may be significantly more complex than that shown in FIG. 4, particularly given that, as set out above, a DVD video zone may have up to $2^{15}$ program chains.

Figure 12:
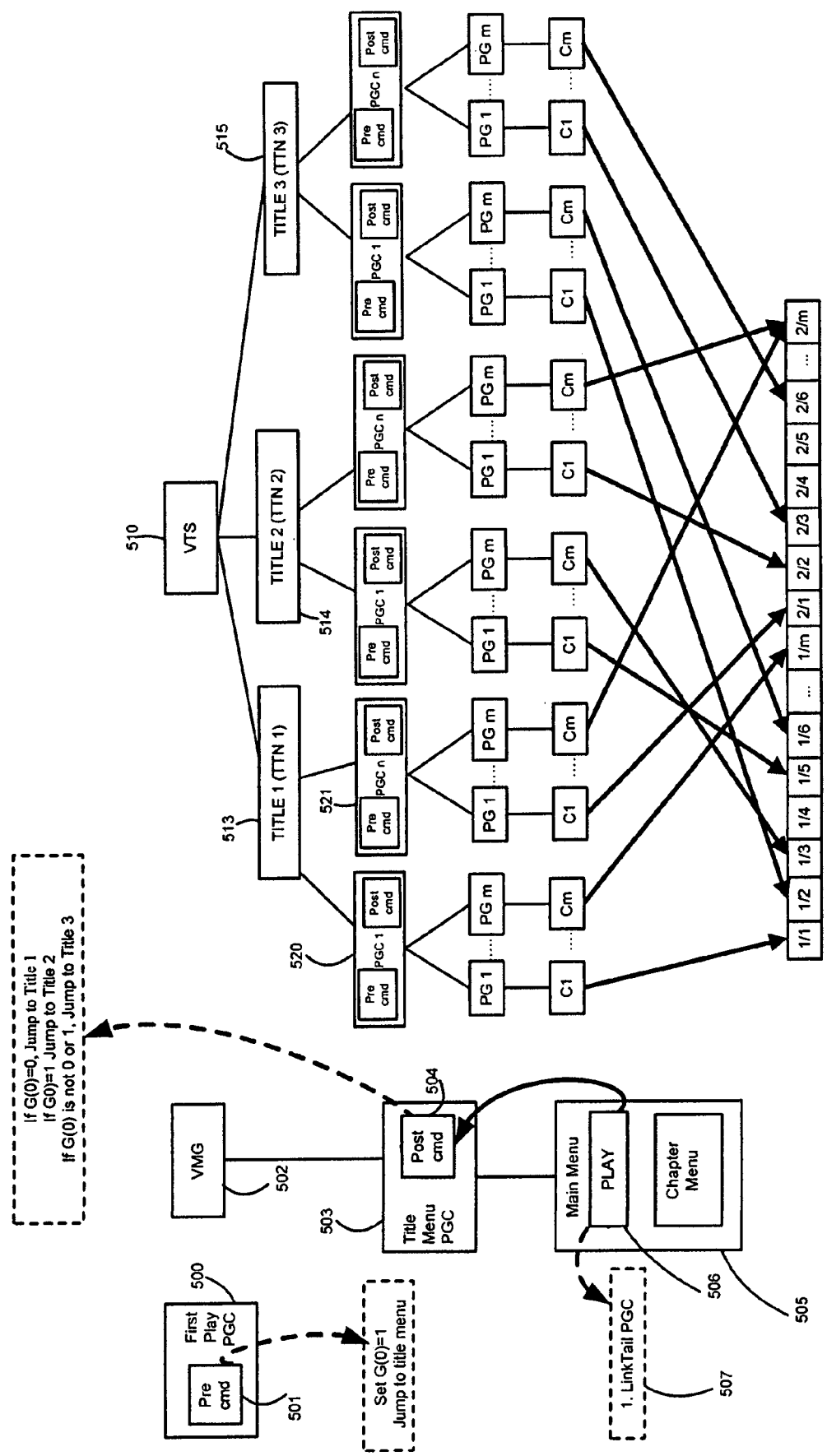
FIG. 12 shows a diagram explaining the navigation data structure of another example of a DVD-Video.

FIG. 12 shows a diagram similar to FIG. 4 illustrating only part of the logical data structure of a more complex DVD video zone.

In the example shown in FIG. 12, the presentation data structure comprises a first play program chain (PGC) 500, a video manager (VMG) 502. FIG. 12 shows a single video title set (VTS) 510, but there may be more.

The video manager 101 provides control information for the entire DVD video zone and has a title menu program chain 104 with a main menu 105.

In the example shown in FIG. 12, the video title set has a language folder (not shown) and three title folders 513, 514 and 515. Each title folder 513, 514 and 515 has n program chains (PGCs), of which only the first and the last 520 and 521, 522 and 523, and 524 and 525 are shown for each video title set.

In FIG. 12, each program chain has m programs (PG 1 to PG m) with a corresponding set of logical cells C1 to Cm.

Each of the program chains is as so far described the same. However, in this example, only the logical cells of the programs of the first video title set 510 map to content data in the correct order. The logical cells of the programs of the second and third video title sets 511 and 512 map to incorrect data. For example, the logical cells of the programs of the second and third video title sets 511 may map to cells containing the true content data but in the wrong order, may omit certain cells, may map to blank cells, may map to black or otherwise irrelevant data, or may map to subversive data or any combination of these. Examples of subversive data that may be used are described in, for example WO02/11136, WO00/74053, WO01/61696 and WO01/61696, the whole contents of each of which are hereby incorporated by reference. Another possibility may be to deliberately damage areas of the DVD referenced by the incorrect program chains which may make any copy DVD containing the incorrect program chains unplayable or may prevent copying altogether.

Although FIG. 12 shows only two false title sets, video title sets 511 and 512, there may be many more and these title sets may be virtually indistinguishable in terms of size, number of cells and so on.

As shown in FIG. 12, the pre-command area 501 of the first play PGC 500 has two commands "set G(0)=1" and "jump to the title menu" while the post-command area 504 of the title menu 503 consists of the commands:
If G(0)=1, Jump to Title 1
If G(0)=0, Jump to title 2
Otherwise Jump to Title 3.

The final PGC 521, 523 and 525 of each title set has a post-command 530, 531 and 532 which, although not shown in FIG. 12, will be "return to title menu".

A legitimate player playing the DVD-Video will first play the first play PGC and thus execute the pre-command 510 to set G(0)=1 so that, when the play button 506 of the main menu is selected (because of the linktail PGC 507), execution of the title menu PGC post command 504 will cause the legitimate player to jump to the Title 1 (VTS1) ignoring the erroneous titles. As, however, can be appreciated from FIG. 8, a file-by-file or sector-by-sector ripper will simply rip all of the sectors in turn and so will copy the erroneous titles having at least one of incorrect data and subversive or unreadable data, so detrimentally affecting at least one of the copy quality, the copying process and the playability of any resultant copy DVD. Similarly, as can be appreciated from FIG. 9, an IFO parsing ripper will when parsing the IFO files find it difficult to identify the correct video title set and may copy an erroneous title which has incorrect data and/or subversive data that detrimentally affects the copying process, the copy quality and/or the playability of any resultant copy DVD. In contrast, a copying apparatus embodying the invention will, as can be understood from FIGS. 10 and 11, emulate a legitimate player and execute the first play PGC thereby being directed towards the correct title, namely the video title set VTS1, and so not copying the incorrect titles.

In the above-described examples, conditional commands are associated with the first play PGC or the Title Menu PGC. A conditional navigation command may, however, be associated with any PGC that is associated with a user menu or another action related to actual playing of the DVD. It will, of course, be appreciated that, in contrast to a file-by-file or sector-by-sector ripper or IFO parsing ripper, a copying apparatus embodying the invention would still be able to identify the correct navigational path or paths regardless of whether conditional navigational commands defining navigational paths conditional on user action or player playing operation are incorporated at the program chain, program or cell level or any combination of these.

As described above, a copying apparatus embodying the invention investigates and may copy the presentation data for all author-defined navigation paths by emulating a player so as to execute conditional navigation commands that are related to player actions or user menu selections. As another possibility, after a copying apparatus embodying the invention has investigated all author-defined navigation paths, the copying apparatus may select for copying a single navigation path according to certain criteria such as size of the presentation data to be accessed, presentation time, number of chapters, or the user may select the navigation path. As another possibility, a user may be prompted during the investigation to make selections to control the navigation path. For example, menus encountered in the navigation sequence by the copying apparatus may be displayed and the user requested to select a menu option from amongst those available.

A DVD Video zone may include more than one conditional navigation command with each conditional navigation command requiring a user menu selection or player activity concerned with actual playing of the DVD to set a register value to the correct value for the conditional navigation command to follow the correct navigational path. This would mean that there may be a number of branching points in the navigational path, with the branching points possibly being dependent upon the user selected menu option, thereby making it even more difficult for apparatus other than copying apparatus embodying the invention or a legitimate player to identify the correct data.

As described above, the parameter upon which the outcome conditional navigation command is based is the register value GPRM(0), however any GPRM may be used. It may also be possible to use an SPRM that can be set by means of a "SetSystem" instruction., for example the audio stream, the sub-picture stream or the angle number SPRM.

As described above, the copying apparatus: 1) accesses and executes the command area of the First Play PGC within the Video Manager Information (VMGI); 2) accesses the destination PGC defined by the First Play PGC; 3) executes any pre-commands for this destination PGC and records, or records the location of, any presentation data to be accessed by the navigation sequence during the execution of this PGC, taking into consideration any cell commands or button commands. The copying apparatus then executes any post-commands for this PGC and, if that post-command leads to a further PGC, executes any pre-commands for that further PGC, records, or records the location of, any presentation data to be accessed by the navigation sequence during the execution of that further PGC (taking into consideration any cell commands or button commands) and then executes any post-commands for that further PGC and so on until a post-command returns to a user options menu. The copying apparatus may display any accessed menu to the user so that the user can select another menu option or may select menu options in turn, repeating the process outlined above for each selected menu option so that at the end of the parsing/copying process you have a sequence of all program chains that have been accessed by some of the possible navigational paths. Navigation data acquired by the navigator for each PGC during this process may be used to create a suitable navigation structure for the copied presentation data. For example, if the user selects the main title only, a very simple DVD-Video structure may be created comprising one VTS only containing the main title. The main title may be arranged into chapters exactly as the main title in the original DVD-Video.

A copying apparatus embodying the invention, by emulating a player, is capable of parsing and utilising the navigation information on the DVD as a player would do and hence of identifying the areas of the DVD that a player would access during normal playback (and, consequently, areas that a player would not access). Thus a copying apparatus embodying the invention can avoid subversive or corrupted data that would be accessed by a file-by-file or sector-by-sector ripper and, unlike an IFO parsing ripper, cannot be fooled into selecting the wrong title folder by the use of conditional commands or the presence of more than one title folder of a size appropriate to a main title.

In the above-described embodiments, the recording medium is an optical disc. It will, of course, be appreciated that the present invention may be applied to other forms of digital recording media such as, for example, magnetic or magneto-optical recording media. In addition, in the above-described embodiments, the recording media is a disc that is read by spinning or rotating the disc about a central axis. It may, however, also be possible to apply the present invention to digital recording media in the form of Digital Linear Tape which is transported along a path past, rather than rotated with respect to, a read/write head.

What is claimed is:

1. Copying apparatus for copying content from a recording medium carrying content data and navigational command data that determines the order in which a player of the recording medium will access the content data, the copying apparatus comprising:
   a reader operable to access locations of the recording medium to read content data and navigation data from a recording medium;
   a navigator operable to execute a navigation command in accordance with navigation data read by the reader;
   a presentation data storer operable to store content data for recording onto a recording medium; and
   a controller operable to control the location of the recording medium accessed by the reader by emulating a player of the recording medium in accordance with the execution of conditional navigation commands by the navigator to cause the reader to follow all navigation paths through the content data defined by the navigation data that are related to player action or user menu selection and to cause the presentation data storer to store the corresponding data for enabling recording of the content data for the navigational paths.

2. Copying apparatus according to claim 1, wherein the controller is operable to cause the presentation data storer to store at least one of: the content data for that navigational path; and data indicating the location on the recording medium of the content data for that navigational path.

3. Copying apparatus according to claim 1, further comprising a recorder operable to record the content data for the navigational path.

4. Copying apparatus according to claim 1, wherein the navigator has at least one register corresponding to a register of such a player of the recording medium and is operable to set a register value in accordance with one of the navigation commands.

5. Copying apparatus according to claim 4, wherein the navigator is operable to execute at least one of the conditional navigation commands in accordance with the set register value.

6. Copying apparatus according to claim 1, wherein the navigator has at least one register corresponding to a register of a such player of the recording medium and is operable to set a register value in accordance with a navigation command associated with at least one of a selection by a user of one of the menu selections of the recording medium and initiation of playing of the recording medium.

7. Copying apparatus according to claim 1, wherein the navigator comprises a virtual state machine and the state of the virtual state machine is determined by a navigation command executed by the navigator.

8. Copying apparatus according to claim 1, operable to copy content from a recording medium in the form of an optical disc such as a DVD, wherein the navigator is operable to execute program chain, program and cell navigation commands carried by the DVD.

9. Copying apparatus according to claim 1, wherein the navigator has at least one register corresponding to a register of such a player of the recording medium, is operable to set a register value in accordance with a navigation command, and is operable to execute at least one of the conditional navigation commands in accordance with the set register value.

10. Copying apparatus according to claim 1, operable to copy content from a recording medium in the form of an optical disc such as a DVD, wherein the navigator has general parameter and special parameter registers corresponding to the general parameter and special parameter registers of such a player and is operable to set a register value in accordance with a navigation command and to execute the navigation commands in the accordance with at least one general parameter register value.

11. Copying apparatus according to claim 1, wherein the navigator is operable to set a register value in accordance with a first program chain command and to execute a conditional navigation command in accordance with a second program chain command.

12. Copying apparatus according to claim 9, wherein the navigator is operable to set a register value in accordance with a first play program chain pre-command and to execute a conditional navigation command in accordance with a title program chain post-command.

13. A method of copying content from a recording medium carrying content data and navigational command data that determines the order in which a player of the recording medium will access the content data, the method comprising:

Accessing locations of the recording medium by a reader to read content data and navigation data from the recording medium;

executing a navigation command by a navigator in accordance with navigation data read by the reader;

controlling by a controller the location of the recording medium accessed by the reader by emulating a player of the recording medium in accordance with the execution of conditional navigation commands by the navigator so as to cause the reader to follow all navigation paths through the content data defined by the navigation data that are related to player action or user menu selection; and the controller storing, by a presentation data storer, content data for recording onto a recording medium the corresponding data for enabling recording of the content data for the navigational paths.

14. A method according to claim 13, wherein a register value of a register corresponding to a register of such a player of the recording medium is set in accordance with one of the navigation commands.

15. A method of producing a digital copy of digital content carried by a DVD, the method comprising:

1) a processor executing a command of a first play program chain within a video manager information of the DVD;
2) the processor accessing a destination program chain defined by the first play program chain;
3) the processor executing a pre-command for the destination program chain;
4) recording, or recording a location of, on a recording medium presentation data to be accessed by the navigation sequence during the execution of the destination program chain;
5) the processor executing a post-command for the destination program chain and, in the event that post-command leads to a further program chain, executing a pre-command for that further program chain, recording, or recording a location of, presentation data to be accessed during the execution of that further program chain, and executing a post-command for that further program chain;
6) repeating 5) until a post-command returns to a user options menu; and
7) in the event a user selects a menu option, repeating 1) to 6) until no further menu options are selected or are available, wherein the method emulates a player of the recording medium to follow all navigation paths through the presentation data that are related to player action or the user menu options.

16. A non-transitory storage medium storing processor-implementable instructions to cause a processor:

1) to execute a command of a first play program chain within video manager information of the DVD;
2) to access a destination program chain defined by the first play program chain;
3) to execute a pre-command for the destination program chain;
4) to record, or record a location of, presentation data to be accessed by the navigation sequence during the execution of the destination program chain;
5) to execute a post-command for the destination program chain and, in the event that the post-command leads to a further program chain, to execute a pre-command for that further program chain, to record, or record a location of, presentation data to be accessed during the execution of that further program chain, and to execute a post-command for that further program chain;
6) to repeat 5) until a post-command returns to a user options menu; and
7) in the event a user selects a menu option, to repeat 1) to 6) until no further menu options are selected or are available, wherein the method emulates a player of the recording medium to follow all navigation paths through the presentation data that are related to player action or the user menu options.

* * * * *